United States Patent
Sugimoto et al.

(10) Patent No.: US 6,862,070 B1
(45) Date of Patent: Mar. 1, 2005

(54) LIQUID CRYSTAL DISPLAY AND MANUFACTURING METHOD THEREOF

(75) Inventors: Osamu Sugimoto, Matsusaka (JP); Hajime Imai, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/730,622

(22) Filed: Dec. 5, 2003

Related U.S. Application Data

(62) Division of application No. 09/735,541, filed on Dec. 14, 2000, now Pat. No. 6,546,954.

(30) Foreign Application Priority Data

Dec. 16, 1999 (JP) .............................................. 11-357982
Mar. 27, 2000 (JP) ......................................... 2000-87408

(51) Int. Cl.[7] ............................................. G02F 1/1343
(52) U.S. Cl. .......................... 349/149; 349/147; 438/72
(58) Field of Search ........................... 438/158; 349/42, 349/43, 149, 147

(56) References Cited

U.S. PATENT DOCUMENTS

| 6,069,019 | A | | 5/2000 | Ishii et al. ..................... 438/30 |
| 6,163,356 | A | | 12/2000 | Song et al. .................. 349/152 |
| 6,310,667 | B1 | * | 10/2001 | Nakayoshi et al. ........... 349/42 |
| 6,621,537 | B1 | * | 9/2003 | Nakamura et al. ............ 349/43 |
| RE38,292 | E | * | 10/2003 | Satou .......................... 438/158 |
| 6,710,372 | B2 | * | 3/2004 | Kim ............................. 257/72 |

FOREIGN PATENT DOCUMENTS

| JP | 63-314848 | 12/1988 | |
| JP | 1992-217231 | 8/1992 | |
| JP | 04-257229 | 9/1992 | ......... H01L/21/336 |
| JP | 06-102528 | 4/1994 | .......... G02F/1/136 |
| JP | 06-208137 | 7/1994 | .......... G02F/1/136 |
| JP | 6-337436 | 12/1994 | |
| JP | 10-068971 | 3/1998 | .......... G02F/1/136 |
| JP | 1998-209458 | 8/1998 | |
| JP | 10-240150 | 9/1998 | |
| JP | 11-109406 | 4/1999 | .......... G02F/1/136 |
| JP | 11-202360 | 7/1999 | |
| KR | 063789 | 10/1998 | ......... H01L/29/786 |
| KR | 0042857 | 6/1999 | .......... G02F/1/015 |

OTHER PUBLICATIONS

Copy of First Office Action received from Chinese Patent Office (and English translation).
U.S. Appl. No. 09/426,584, filed Oct. 25, 1999.
Copy of Office Action (along with English translation).

* cited by examiner

*Primary Examiner*—John F. Niebling
*Assistant Examiner*—Andre' C. Stevenson
(74) *Attorney, Agent, or Firm*—David G. Conlin; Edwards & Angell

(57) ABSTRACT

An protective film and a resin layer are stacked on an insulation substrate on which a TFT is formed, and after a contact hole is formed in the resin layer, the protective film below the contact hole is etched and removed. A pixel display electrode is allowed to contact a drain electrode at the area of the contact hole; thus, a liquid crystal display is formed. A cut-out section, which communicates with the lower layer is formed in the drain electrode in the area of the contact hole. Upon forming a TFT section island-shape semiconductor layer so as to provide a TFT, a hole section island-shape semiconductor layer is also formed in the area of the contact hole. With this arrangement, it is possible to provide a manufacturing method of a liquid crystal display which can avoid the occurrence of a step discontinuity in the pixel display electrode and the subsequent disconnection in the pixel display electrode.

7 Claims, 14 Drawing Sheets

LIQUID CRYSTAL DISPLAY AND MANUFACTURING METHOD THEREOF

This application is a Divisional of U.S. application Ser. No. 09/735,541, filed Dec. 14, 2000 now U.S. Pat. No. 6,546,954, the teachings of which are incorporated herein by reference.

FIELD OF THE INVENTION

The present invention relates to a liquid crystal display which drives the liquid crystal by using an active matrix substrate on which a thin-film transistor (hereinafter, referred to TFT (Thin Film Transistor) is formed, and also concerns a manufacturing method for such a liquid crystal display.

BACKGROUND OF THE INVENTION

As illustrated in FIG. 14, in a conventional liquid crystal display using a TFT as a switching element, on a glass substrate 101 are placed a gate electrode 102 formed through the same process, gate wiring (not shown) connected to the gate electrode 102 and a source signal input terminal 103.

Moreover, a gate insulation film 105 is formed on the entire surface of the glass substrate 101, except for a terminal section contact hole 104 formed on the source signal input terminal 103. On the gate electrode 102 are placed, through a gate insulation film 105, an amorphous silicon semiconductor layer (hereinafter, referred to as a-Si layer) 106 and an amorphous silicon semiconductor layer (hereinafter referred to as $n^+$ a-Si layer) 107. The $n^+$ a-Si layer 107, which is an amorphous silicon semiconductor layer to which an impurity is added, is an ohmic contact layer that is provided so as to ohmic-connect the a-Si layer 106 to a source electrode and a drain electrode, which will be described later.

A source electrode 108 and a drain electrode 109 are placed on the a-Si layer 106 and $n^+$ a-Si layer 107, and a source wire 110 is formed integrally with the source electrode 108 through the same process.

A TFT 111 is constituted by the gate electrode 102, a-Si layer 106, $n^+$a-Si layer 107, source electrode 108, and drain electrode 109, etc., arranged as described above.

Moreover, a protective film 113 and a resin layer 114, which are used for protecting one portion of the source wire 110 and the TFT 111, are formed except for the terminal section contact hole 104 and a display section contact hole 112 formed on the drain electrode 109.

Moreover, the connection electrode 115 is joined to the source signal input terminal 103 so that the source wire 110 and the source signal input terminal 103 are connected to each other through the terminal contact hole 104. Moreover, the display electrode layer 116 and the drain electrode 109 are connected through the display contact hole 112.

The above-mentioned conventional liquid crystal display is manufactured through the following processes (1) to (8):

(1) First, a metal thin film, composed of titanium (Ti), aluminum (Al), or chromium (Cr), etc., is formed on a washed glass substrate 101 by sputtering, etc. Then, a photolithographic technique, which carries out etching by using a mask that is formed by applying photoresist to the metal thin film and exposing and developing it, is used to simultaneously form the gate electrode 102, the gate wire connected to the gate electrode 102 and the source signal input terminal 103.

(2) $SiN_x$, which forms a gate insulation film 105, is formed thereon by using a mixed gas of $SiH_4/NH_3/N_2$ through a P-CVD method.

(3) an a-Si film is formed on the gate insulation film 105 by using $SiH_4/H_2$.gas through a P-CVD method. In the same manner, an $n^+$a-Si film is formed by using $SiH_4/H_2$.gas with mixed $PH_3$ through a P-CVD method. Thereafter, the a-Si layer 106 and the $n^+$a-Si layer 107 are patterned through a photolithography technique, etc.

(4) Moreover, a multi-layer structure metal thin-film, such as an Al/Ti thin-film, is formed, and this metal thin film is patterned through a photolithography technique, etc. so that a source electrode 108, a drain electrode 109 and a source wire 110 are formed.

(5) Next, $SiN_x$ is deposited by a P-CVD method using a mixed gas of $SiH_4/NH_3/N_2$ to form a protective film 113.

(6) On the protective film 113, a resin layer 114, which serves as a second protective film, is patterned and formed through a photolithography method, etc., and is subjected to a heating process, etc. to cure the resin. In this state, terminal section contact holes 104 and display section contact holes 112 are formed in the resin layer 114.

(7) Next, in the terminal section contact hole 104, the gate insulation film 105 and the protective film 113 are simultaneously etched and removed by using the source wire 110 and the resin layer 114 as masks. Here, with respect to the display section contact hole 112 formed in the process (6), since the drain electrode 109 serves as an etching stopper, the gate insulation film 105 beneath it is allowed to remain.

(8) The connection electrode 115 and the display electrode 116 are formed.

Moreover, as illustrated in FIG. 15(a) and FIG. 15(b), in another liquid crystal display, on an insulation substrate 201 made of glass, etc., a gate wire 202 on which a gate signal input terminal 202a and a gate electrode 202b are integrally formed, a support capacity wire 204, a support capacity electrode 204b and support capacity signal input terminal 204a connected to the support capacity wire 204 are formed.

Then, on top of these layers, through a gate insulation film 207, are formed an a-Si layer 208a made of an amorphous silicon semiconductor layer, and an $n^+$a-Si layer 208b that is an amorphous silicon semiconductor layer to which impurities such as phosphor (P) are added so as to realize ohmic connections between the a-Si layer 208a and a source electrode 209b as well as a drain electrode 210.

Next, after a multi-layer structure film, such as an Al/Ti film, not shown, has been deposited on the a-Si layer 208a and $n^+$a-Si layer 208b that are the semiconductors, a source electrode 209b, a drain electrode 210 and a source wire 209 that serves as bus wiring for them are formed. Moreover, a TFT 211 is formed by the source wire 209, a source electrode 209b and a source signal input terminal 209c that are integral with the source wire 209 and a drain electrode 210.

Next, an overcoat layer 212, made of an insulation film such as SiN, for protecting the source wire 209 and TFT 211, and a resin insulation film 213 made of an insulation photosensitive acrylic resin, etc. are successively laminated so that an overcoat layer having a two-layer structure is formed.

Next, the resin insulation film 213, made of a photosensitive acrylic resin, etc., is exposed in an exposing process by using a predetermined mask, and then subjected to a developing process so that a contact hole 215 is formed in the resin insulation film 213. Simultaneously with this process, the resin insulation film 213 over the source signal input terminal 209c, the gate signal input terminal 202a and support capacitor signal input terminal 204a is removed therefrom.

By using the resin insulation film 213 thus patterned as a mask for an etching process, the overcoat layer 212 located at the bottom of the contact hole 215, and the overcoat layer 212 covering the source signal input terminal 209c, the gate signal input terminal 202a and the supplementary capacitance signal input terminal 204a are simultaneously removed.

Successively, by using the resin insulation film 213 patterned as described above as a mask for an etching process, the gate insulation film 207 covering the gate signal input terminal 202a and the supplementary capacitance signal input terminal 204a is removed therefrom.

Next, a pixel display electrode 214, which is used for applying a voltage to liquid crystal formed over the surface of the resin insulation film 213 including the inside of the contact hole 215 formed in the resin insulation film 213, is formed so that the drain electrode 210 on the base section of the contact hole 215 is electrically connected.

However, the above-mentioned manufacturing method for the conventional liquid crystal display has raised the following problems.

In the liquid crystal display having the arrangement shown in FIG. 14, upon simultaneously etching the gate insulation film 105 and the protective film 113 in the above-mentioned process (7), since the source wire 110 serving as the mask is not etched at all, the gate insulation film 105, placed beneath the source wire 110, is selectively etched quickly. This results in a state in which the gate insulation film 105 comes under the source wire 110 (a reversely-tapered shape), and when the connection electrode 115 is formed in the process (8), a step discontinuity section 117 of the connection electrode 115, shown in FIG. 6, tends to be formed. Such a step discontinuity section 117 raises a problem of disconnection between the source signal input terminal 103 and the source wire 110.

Moreover, in the manufacturing method of the liquid crystal display shown in FIG. 15(a) and FIG. 15(b), with respect to the etching rate, the following relationship is given between the resin insulation film 213 and the overcoat layer 212: (etching rate of the resin insulation film 213)< (etching rate of the overcoat layer 212). Moreover, in the case when the etching rate of the drain electrode 210 is not more than 1/10 of that of the overcoat layer 212, while the gate insulation film 207 corresponding to portions of the gate signal input terminal 202a and the supplementary capacitance signal input terminal 204a is being etched, the etching process inside the contact hole 215 stops progressing downward, while it starts proceeding sideways, with the result that the etched portion of the overcoat layer 212 reaches the rear face of the resin insulation film 213, forming a reversely-tapered shape 217.

Consequently, in this state, a step discontinuity occurs in the pixel display electrode 214 that is formed in a succeeding process, resulting in failure in providing electrical connections in the pixel display electrode 214.

SUMMARY OF THE INVENTION

The objective of the present invention is to provide a liquid crystal display which makes it possible to avoid the occurrence of a step discontinuity in an electrode for making a connection to a connecting section inside a contact hole, and a manufacturing method for such a liquid crystal display.

In order to achieve the above-mentioned objective, the liquid crystal display of the present invention is provided with a terminal section, formed on a substrate, to which signals are inputted from outside, an insulation layer formed on the terminal section, film-shaped wiring that is connected to electrodes of thin-film switching elements formed on each pixel, and a connection conductive film, placed in the contact hole, for connecting the terminal section and the end portion of the wiring. In this arrangement, a semiconductor layer is formed between the wiring and the insulation layer, and the insulation layer, the semiconductor layer and the end portion of the wiring are allowed to respectively protrude toward the inside of the contact hole, with respective depths in this order.

Here, consideration is given to a case in which, upon forming a contact hole in an insulation layer, the insulation layer at the formation position of the contact hole is etched and removed by using, for example, the above-mentioned wiring as a mask. In general, the wiring is formed by using a material that is not etched by gas, etc. used at the time of etching the insulation layer. In this case, if the above-mentioned semiconductor layer is not formed, the insulation layer located under the wiring will be selectively etched rapidly through the etching process at the time of the formation of the contact hole. For this reason, the pattern end of the insulation layer will come to have a reversely-tapered shape.

In contrast, in the arrangement of the present invention, the semiconductor layer is formed between the insulation layer and the end portion of the wiring. For example, supposing that the semiconductor layer has an etching rate slower than that of the insulation layer, in an etching process using the wiring as a mask, not only the insulation layer, but also the semiconductor layer is etched although the rate thereof is slow. For this reason, the above-mentioned insulation layer is not selectively etched rapidly. Therefore, it is possible to form the pattern end portion of the insulation layer into a forwardly-tapered shape.

With this arrangement, when the terminal section and the connection end portion of the wiring are connected by the connection conductive film through the contact hole, the connection conductive film is free from a step discontinuity at the pattern end of the insulation layer, thereby making it possible to improve the reliability of the connection.

In order to achieve the above-mentioned objectives, the manufacturing method of the liquid crystal display of the present invention is provided with: a first step for forming a terminal section and a gate electrode made of a metal film on an insulation substrate; a second step for forming an insulation layer that covers the terminal section and the gate electrode; a third step for forming a semiconductor film and an ohmic contact film on a connection end portion of the terminal section and the gate electrode so that a film is patterned and formed on the terminal section and a semiconductor operation layer of a thin-film transistor is patterned and formed on the gate electrode, by the semiconductor film and the ohmic contact film; a fourth step for forming wiring so that the connection end portion of the wiring is placed on the film; a fifth step for forming a contact hole by etching and removing the insulation layer by using the wiring as a mask; and a sixth step for connecting the wiring and the terminal section by a connection conductive film through the contact hole.

In accordance with the above-mentioned method, during a process for forming a semiconductor operation layer of the thin-film transistor, the film is formed on the connection end portion of the terminal section through the gate insulation film. In other words, the film is formed in the same process that forms the semiconductor operation layer of the thin-film transistor; therefore, it is not necessary to increase the number of processes for forming films.

Therefore, it becomes possible to positively connect the terminal section and the connection end portion of the wiring by using the connection conductive film with ease without increasing the number of processes, and consequently to ensure the reliability of the connection.

Moreover, in the case when, upon forming a contact hole in an insulation layer, the insulation layer at the formation position of the contact hole is etched and removed by using the wiring as a mask, the wiring is generally formed by using a material that is not etched by gas, etc. used at the time of etching the insulation layer. In this case, if the above-mentioned film is not formed, the insulation layer located under the wiring will be selectively etched rapidly through the etching process at the time of the formation of the contact hole. For this reason, the pattern end of the insulation layer will come to have a reversely-tapered shape.

In contrast, in accordance with the above-mentioned method, the film which has an etching rate slower than that of the insulation layer is placed between the insulation layer and the connection end portion of the wire in a manner so as to be extended toward the inside of the contact hole from the connection end portion of the wiring. Therefore, in an etching process using the wiring as a mask, not only the insulation layer, but also the film is etched although the rate thereof is slow. For this reason, the above-mentioned insulation layer is not selectively etched rapidly. Therefore, it is possible to form the pattern end portion of the insulation layer into a forwardly-tapered shape.

With this arrangement, when the terminal section and the connection end portion of the wiring are connected by the connection conductive film through the contact hole, the connection conductive film is free from a step discontinuity at the pattern end of the insulation layer, thereby making it possible to improve the reliability of the connection.

As a result, it is possible to provide a manufacturing method of a liquid crystal display which can avoid the occurrence of a step discontinuity in the pixel display electrode and the subsequent disconnection in the pixel display electrode.

Moreover, the manufacturing method of a liquid crystal display of the present invention may have the following arrangement: Upon forming a first semiconductor layer for forming a thin-film transistor, a second semiconductor layer is formed also in the area of a contact hole, and a thin-film transistor, which includes the first semiconductor layer and a drain electrode having a through hole or a cut-out section which communicates with the lower layer in the areas of the source electrode and the contact hole so as to provide switching to the pixel, is formed. On this are stacked a protective film layer and a resin insulation film, and after forming a contact hole in the resin insulation film, the protective film layer below the contact hole is etched and removed, and a pixel display electrode for applying a voltage to the liquid crystal is formed in the area of the contact hole in a manner so as to contact the drain electrode.

In the above-mentioned invention, upon manufacturing a liquid crystal display, first, the thin-film transistor which is provided with the source electrode and the drain electrode for providing switching operations to the pixels is formed. Next, the protective film layer and the resin insulation film are stacked thereon, and the contact hole is formed in the resin insulation film. Thereafter, the protective film layer below this contact hole is etched and removed, and the pixel display electrode for applying a voltage to the liquid crystal is placed in the corresponding area of the contact hole in a manner so as to contact the drain electrode.

Here, in conventional methods, upon etching the protective film layer below the contact hole, the etching process stops progressing downward at the drain electrode located below, while it starts progressing sideways, with the result that the protective film layer is etched beyond the area of the contact hole.

Consequently, when the pixel display electrode is stacked on the contact hole from above, since the stacked conductor material for forming the pixel display electrode is dispersed in the area of the protective film layer on the bottom face of the contact hole, resulting in a step discontinuity in the pixel display electrode, and the subsequent electrical disconnection in the pixel display electrode.

However, in the present embodiment, the through hole or the cut-out section which communicates with the lower layer is formed in the drain electrode in the area of the contact hole. Thereafter, upon forming the first semiconductor layer for providing the thin-film transistor, the second semiconductor layer is also formed in the area of the contact hole. In this case, the second semiconductor layer is formed as a dummy.

In other words, upon forming the first semiconductor layer for providing the thin-film transistor, the second semiconductor layer is also formed in the area of the contact hole; therefore, upon etching the protective film, on the bottom face of the contact hole, the protective film, the drain electrode having the through hole or the cut-out section formed therein and the second semiconductor layer are stacked in this order from above.

Therefore, when the protective film layer is etched, first, the protective film layer is etched, and the etching direction is directed toward the second semiconductor layer that is susceptible to etching so that it is possible to avoid etching in the lateral direction to the protective film layer, and consequently to provide a forwardly-tapered shape.

For this reason, when after the etching process, the conductor material for the pixel display electrode is stacked, the conductor material is not susceptible to a step discontinuity.

As a result, it is possible to provide a manufacturing method of a liquid crystal display which can avoid the occurrence of a step discontinuity in the pixel display electrode and the subsequent disconnection in the pixel display electrode.

Moreover, the manufacturing method of the liquid crystal display of the present embodiment is preferably provided with the steps of: forming on an insulation substrate a gate wire, a gate electrode connected to the gate wire, a supplementary capacitance wire, and a supplementary capacitance electrode connected to the supplementary capacitance wire; forming a gate insulation film on the respective gate wire, the gate electrode, the supplementary capacitance wire and the supplementary capacitance electrode; forming a first semiconductor layer made by stacking an a-Si film and an n$^+$a-Si film, above the gate electrode through the gate insulation film, as well as simultaneously forming a second semiconductor layer made by stacking an a-Si film and an n$^+$a-Si film, above the supplementary capacitance electrode through the gate insulation film; forming a source electrode and a drain electrode, each having one end stacked on the second semiconductor layer above the gate electrode, and a source wire serving as a source line connected to the source electrode, the drain electrode having the other end also stacked on the second semiconductor layer above the supplementary capacitance electrode with the other end being provided with a cut-out section or a through hole; etching and removing the n$^+$a-Si film of the second semiconductor layer above the supplementary capacitance electrode while using the drain electrode having the cut-out section or the through hole as a mask; simultaneously with the etching process of the n+a-Si film of the second semiconductor layer above the supplementary capacitance electrode, etching and separating the n+a-Si film of the first semiconductor layer while using as masks the source electrode and the drain electrode, each having one end stacked on the first semiconductor layer above the gate electrode; forming a protective film layer over the entire surface of the substrate; forming a resin insulation film on the protective film layer; forming a contact hole in the resin insulation film with the pattern of the cut-out section or the through hole of the drain electrode above the supplementary capacitance electrode being allowed to traverse the contact hole as well as simultaneously removing the resin insulation layer on the source signal input terminal, the gate signal input terminal and the supplementary capacitance signal input terminal; simultaneously etching and removing the protective film layer on the source signal input terminal, the gate signal input terminal and the supplementary capacitance signal input terminal and the protective film layer on the bottom face section within the contact hole, while using as etching masks the patterned resin insulation layer and the pattern of the cut-out section or the through hole of the drain electrode within the contact hole; and etching the gate insulation film on the gate signal input terminal and the supplementary capacitance signal input terminal so as to remove the gate insulation film on the gate signal input terminal, as well as simultaneously etching the a-Si film of the second semiconductor layer at a portion thereof exposed to an area surrounded by the cut-out section or the through hole of the drain electrode and the contact hole.

Therefore, inside the contact hole in the resin insulation film, the cut-out section or the through hole is formed in the drain electrode in a manner so as to traverse the contact hole, and the second semiconductor layer is formed between the drain electrode and the gate insulation film that is the lower layer; thus, the second semiconductor layer has an intermediate etching selectivity between the protective film layer and the drain electrode so that the etching process is allowed to progress downward to the second semiconductor layer, and is not allowed to progress sideways.

For this reason, the etching process provides a forwardly-tapered shape on the bottom face of the contact hole; therefore, even when the pixel display electrode is formed from the inside of the contact hole to the surface of the resin insulation layer, it is possible to prevent a step discontinuity occurring in the pixel display electrode within the contact hole.

For a fuller understanding of the nature and advantages of the invention, reference should be made to the ensuing detailed description taken in conjunction with the accompanying drawings.

DESCRIPTION OF THE EMBODIMENTS

[Embodiment 1]

Referring to FIGS. 1(a) and 1(b) through FIGS. 5(a) and 5(b), the following description will discuss one embodiment of the present invention.

Figure 1A:
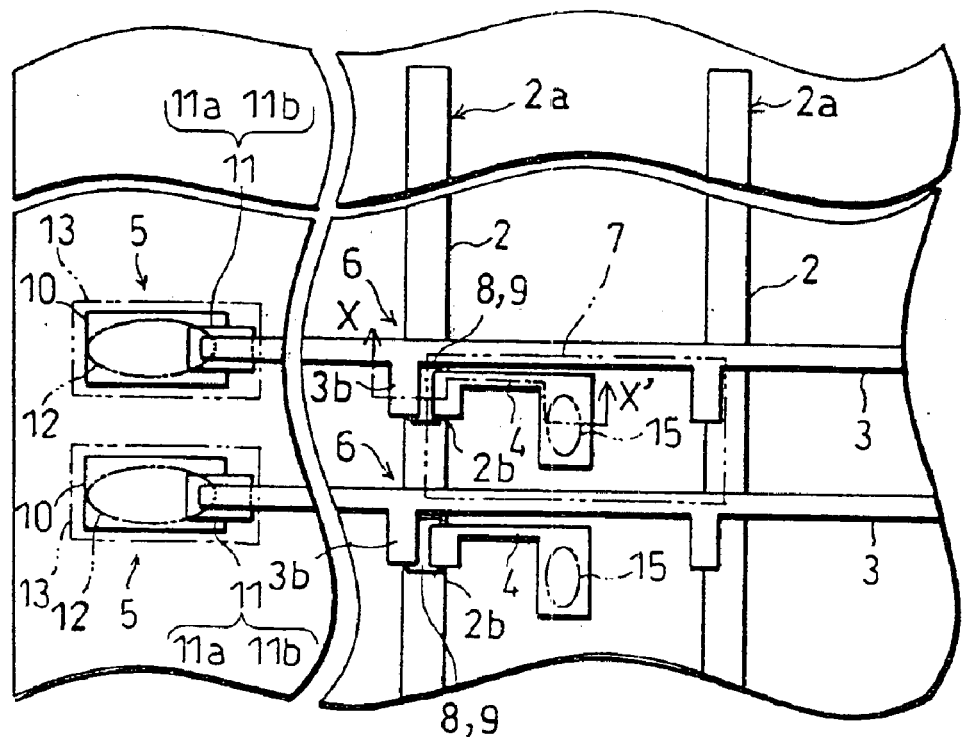
FIG. 1(a) is a plan view that shows a TFT array substrate of a liquid crystal display in accordance with one embodiment of the present invention.

FIG. 1(a) is a plan view that shows a construction of an array substrate (substrate) (hereinafter, referred to as "TFT: Thin Film Transistor"), and FIG. 1(b) is a cross-sectional view taken along line X–X' of FIG. 1(a).

Figure 1B:
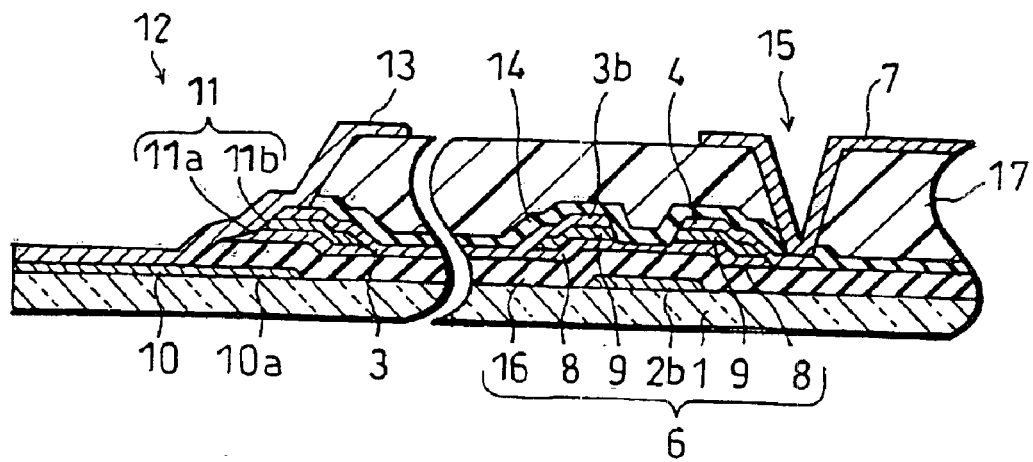
FIG. 1(b) is a cross-sectional view taken along line X–X' of FIG. 1(a).

As illustrated in FIG. 1(a) and FIG. 1(b), the above-mentioned liquid crystal display has a TFT array substrate that is constituted by: a gate wire 2 formed on an insulation substrate 1 made of glass, etc., a source wire (wiring) 3 that is orthogonal to the gate wire 2, a gate signal input terminal 2a that is connected to the gate wire 2 so as to supply signals from outside to the gate wire 2, a source signal input terminal section 5 for supplying signals from an external driving circuit to the source wire 3, a TFT 6 that is placed in each pixel as a switching element in a matrix format, and a pixel display electrode 7 (in the Figure, indicated by an alternate long and two short dashes line) that is connected to each TFT 6 and that is made of ITO (Indium Tin Oxide).

Onto the gate wire 2 is placed a gate electrode 2b that is linearly aligned with the wire, for each pixel, and this is connected to each TFT 6. Moreover, the gate wire 2 is connected to each gate signal input terminal 2a so that signals from a gate-side driving circuit (not shown) are supplied to the gate wire 2. The gate wire 2 and the gate electrode 2b are formed by a single layered or multi-layered metal thin film made of an electric conductor such as Ti, Al, Cr, etc.

Source electrodes 3b are placed on the source wire 3 in such a manner that each of them is branched from the source wire 3 for each pixel, and connected to the TFT 6. Moreover, the source wire 3 is connected to the source signal input terminal section 5 so that signals from a source-side driving circuit (not shown) are supplied to the source wire 3. The source wire 3 and the source electrode 3b are formed by a single layered or multi-layered metal thin film made of an electric conductor such as Ti, Al, Cr, etc.

An explanation will be given of a specific construction of the source signal input terminal section 5. First, a source signal input terminal (terminal section) 10, made from the same material as that of the gate wire 2 and the gate electrode 2b, is placed on the insulation substrate 1. An island-shape semiconductor layer (film, semiconductor layer) 11 is placed between the source signal input terminal 10 and the source wire 3 at their mutually overlapped portion (connection portion) between the source signal input terminal 10 and the source wire 3. This island-shape semiconductor layer 11 is constituted by a lower layer 11a and an upper layer 11b. The lower layer 11a is made from the same material as an a-Si layer forming the TFT6, which will be described later, and the upper layer 11b is made from the same material as an n$^+$a-Si layer forming the TFT6, which will be described later. Moreover, the source signal input terminal section 5 is coated with a protective film which will be described later; and in this protective film is formed a terminal section contact hole (contact hole) 12 which is used for connecting the source wire 3 and the source signal input terminal 10 of the connection portion by a connection electrode (connecting conductive film) 13 (indicated by an alternate long and two short dotted line, in the Figure) made from the same material as that of the pixel display electrode 7.

The pixel display electrode 7 is connected to a drain electrode 4 through the display section contact hole 15 formed in the protective film 19 on the drain electrode 4 connected to the TFT 6.

Here, in FIG. 1(a), for convenience of explanation of the structure of the liquid crystal display in accordance with the present embodiment, the protective film 19 is omitted.

Next, referring to FIG. 1(b), a detail explanation will be given of the TFT 6 and the source signal input terminal section 5.

First, an explanation will be given of the TFT 6. On the gate electrode 2b formed on the insulation substrate 1, an amorphous silicon semiconductor layer (hereinafter, referred to as a-Si layer) 8, and an amorphous silicon semiconductor layer (hereinafter, referred to as n$^+$a-Si layer) 9 are placed through the gate insulation film (insulation layer) 16 made from SiN$_x$. The n$^+$a-Si layer 9 is an amorphous silicon semiconductor layer to which impurities are added, and in the present embodiment, it is doped with phosphor (P), and serves as an ohmic contact layer that is placed so as to ohmic-connect the a-Si layer 8 to the source electrode 3b and the drain electrode 4.

The source electrode 3b and the drain electrode 4 are respectively formed on the n$^+$a-Si layer 9. The drain electrode 4 is made of a metal thin film such as Ti, Al, Cr, etc. in the same manner as the source electrode 3b.

Moreover, the protective film 14, made from SiN$_x$, is placed on the source electrode 3b and the drain electrode 4.

In the source signal input terminal section 5, the gate insulation film 16 is formed on the connection end 10a of the source signal input terminal 10 placed on the insulation substrate 1, and on the gate insulation film 16 are further placed the lower layer 11a of the island-shape semiconductor layer 11 made from the same material as the a-Si layer 8 and the upper layer 11b of the island-shape semiconductor layer 11 made from the same material as an n$^+$a-Si layer 9. As described earlier, the island-shape semiconductor layer 11 is placed beneath the connection end of the source wire 3 that provides connections to the source signal input terminal 10.

The source signal input terminal section 5 is covered with the protective film 14. Here, FIG. 1(b) is a cross-sectional view that shows the terminal section contact hole 12 and the vicinity thereof in which on the source wire 3, not the protective film 14, but the connection electrode 13 connected to the source signal input terminal 10 through the terminal section contact hole 12 is placed. The source signal input terminal 10 and the source wire 3 are connected by this connection electrode 13.

Moreover, preferably, the source wire 3 is extended 0.5 to 10 μm from the periphery of the terminal section contact hole 12 to the inside of the terminal section contact hole 12, and the island-shape semiconductor layer 11 is designed in a manner so as to further extend 0.5 to 10 μm to the inside of the terminal section contact hole 12.

Next, referring to FIGS. 2(a) through 2(d), the following description will discuss the manufacturing method of a liquid crystal display in accordance with the present embodiment.

(1) First, a metal thin film (a single layered film, or a multi-layered film), composed of a conductor material, such as titanium (Ti), aluminum (Al), or chromium (Cr), etc., is formed on a washed insulation substrate 1 by sputtering, etc. Then, a photolithographic technique, which carries out etching by using a mask that is formed by applying photoresist to the metal thin film and exposing and developing it, is used to simultaneously form a gate electrode 2b, a gate wire 2 connected to the gate electrode 2b, a gate signal input terminal 2a connected to the gate wire 2 and a source signal input terminal 10 which is connected to a source wire 3 in a process later.

Here, with respect to the uppermost layer of the metal thin film forming the gate wire 2, etc., it is preferable to use metal, such as TiN, Ti and Cr, having a superior etching resistance to a mixed gas of CF$_4$/O$_2$, from the viewpoint of the surface strength against etching damage, for example, upon forming the terminal section contact hole 12 and the display section contact hole 15 of a gate insulation film 16, which is described below.

(2) SiN$_x$, which forms the gate insulation film 16, is formed thereon by using a mixed gas of SiH$_4$/NH$_3$/N$_2$ through a P-CVD method.

(3) An a-Si film (semiconductor film) is formed on the gate insulation film 16 by using a mixed gas of SiH$_4$/H$_2$ through a P-CVD method. In the same manner, an n$^+$a-Si film, which is an ohmic contact film, is formed by using, for example, SiH$_4$/H$_2$.gas with which 0.5% of PH$_3$ is mixed through a P-CVD method. Thereafter, the a-Si layer 8 and the n$^+$a-Si layer 9 are patterned through a photolithography technique, etc., so as to provide a predetermined shape (island shape or line shape) within the display area.

Moreover, on the top of the connection end 10a of the source signal input terminal 10 formed so as to have an island shape in the process (1), the island-shape semiconductor layer 11 is formed by patterning the a-Si film and n$^+$a-Si film so that the island-shape semiconductor layer 11 is formed in a manner so as to extend 0.5 to 10 μm to the inside of the terminal section contact hole 12 from the source wire 3. At this stage, the gate insulation film 16 is still formed over the entire surface, and remains on the source signal input terminal 10 (see FIG. 2(a)).

(4) Moreover, a metal thin-film (a single-layer film or a multi-layer film) made of a conductor material, such as Ti, Al, Cr, etc., is formed through a sputtering method, etc., and this metal thin film is patterned through a photolithography method, etc. so that a source electrode 3b, a drain electrode 4 and a source wire 3 are formed.

Figure 2A:
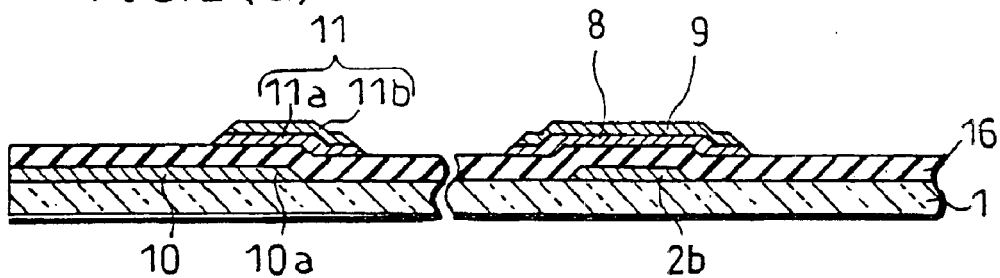
FIGS. 2(a) through FIG. 2(d) are drawings that show processes for manufacturing the TFT array substrate of the liquid crystal display of FIG. 1.
Figure 2B:
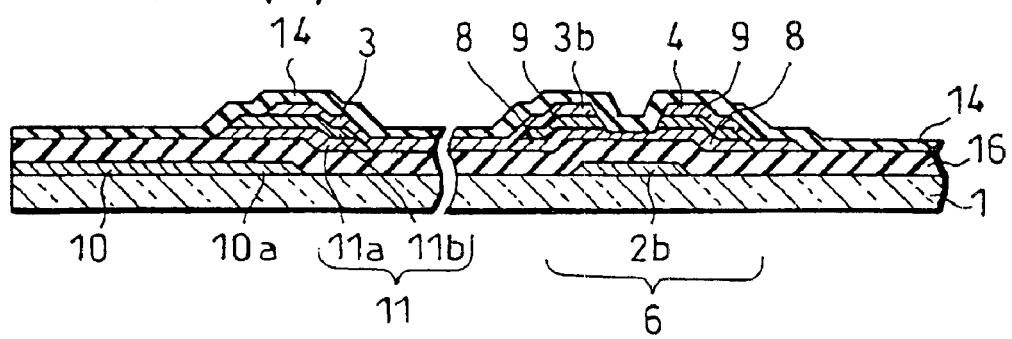
Figure 2C:
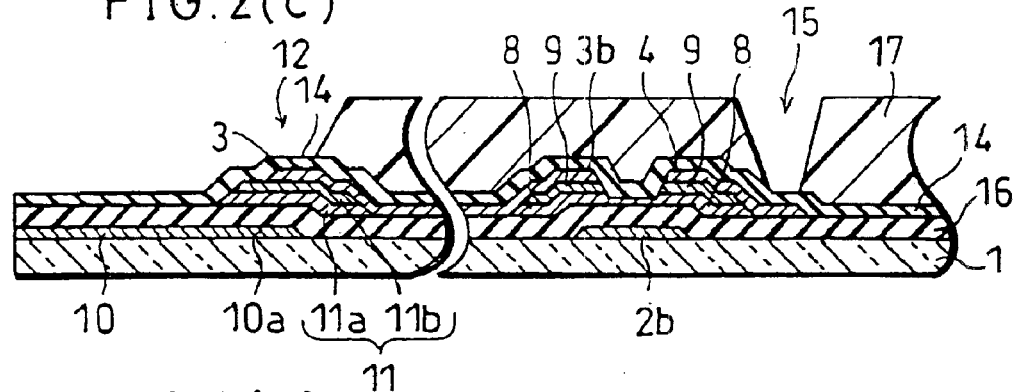

(5) Next, SiN$_x$ is deposited by a P-CVD method using a mixed gas of SiH$_4$/NH$_3$/N$_2$ to form a protective film 14 (see FIG. 2(b)).

(6) On the protective film 14, a resin layer 17, which serves as a second overcoat layer, is patterned and formed through a photolithography method, etc., and is subjected to a heating process, etc. to cure the resin. In this state, the terminal section contact hole 12 and the display section contact hole 15 are formed in the resin layer 17 (see FIG. 2(c)).

Figure 2D:
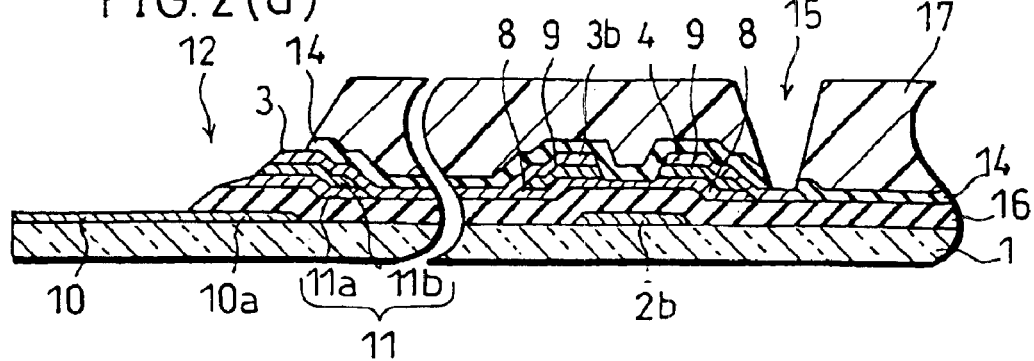

(7) Next, the gate insulation film 16 and the protective film 14 are simultaneously etched and removed while using the source wire 3 and the resin layer 17 as masks, for example, by using a dry etcher of the RIE mode in which a mixed gas of CF$_4$/O$_2$ is used. As illustrated in FIG. 2(d), in the display section contact hole 15 formed in the resin layer 17 in the process (6), since the drain electrode 4 serves as an etching stopper, the gate insulation film 16 beneath it is allowed to remain. With respect to the terminal section contact hole 12 formed in the resin layer 17 in the same manner in the process (6), the gate insulation film 16 is etched and removed at its portion on which there is no source wire 3 (serving as a mask) that has been formed in a manner so as to further extend 0.5 to 10 μm from the terminal section contact hole 12 into the inside thereof.

(8) Next, an ITO film is formed by a sputtering method, etc., and the ITO film is patterned by a photolithographic method, etc. so that an image display electrode 7 and a connection electrode 13 are formed.

As described above, in the liquid crystal display in accordance with the present invention, in the source signal input terminal section 5, on the gate insulation film 16, the island-shape semiconductor layer 11 (having a ratio of etching rate of 1/2 to 1/20 of the gate insulation film 16), which is less susceptible to etching than the gate insulation film 16, is placed so as to further extend 0.5 to 10 μm from the end of the source wire 3 to the inside of the terminal section contact hole 12; thus, it is possible to form the gate insulation film 16 below the source wire 3 in a forwardly tapered shape. This arrangement makes it possible to eliminate a step discontinuity in the connection electrode 13, and consequently to connect the source wire 3 and the input terminal 10 positively.

Here, for example, in the case when the connection electrode 13 is made of ITO, since ITO is great in the resistivity, if the size of the extended portion of the island-shape semiconductor layer 11 is larger than the above-mentioned size, when the source wire 3 and the source signal input terminal 10 are allowed to conduct by the connection electrode 13, additional resistance is added thereto. In other words, the inputted signal is transmitted through a path from the source signal input terminal 10 to the source wire 3 through the connection electrode 13; and the distance transmitted through the connection electrode 13 is represented by the size of the portion of the island-shape semiconductor layer 11 extended from the end of the source wire 3; consequently, if the distance of the extended portion is too long, the resistance increases correspondingly.

In contrast, if the size of the extended portion of the island-shape semiconductor layer 11 is smaller than the above-mentioned size, the island-shape semiconductor layer 11 is masked by the source wire 3, and is not etched, with the result that the gate insulation film 16 placed below the island-shape semiconductor layer 11 is selectively etched rapidly to form a reversely-tapered shape. For this reason, the connection electrode 13 comes to have a step discontinuity, resulting in electrical disconnection.

For the reasons as described above, the size of the island-shaped semiconductor layer 11 is preferably designed in a manner so as to further extend 0.5 to 10 μm from the end of the source wire 3 to the inside of the terminal section contact hole 12.

Figure 3:
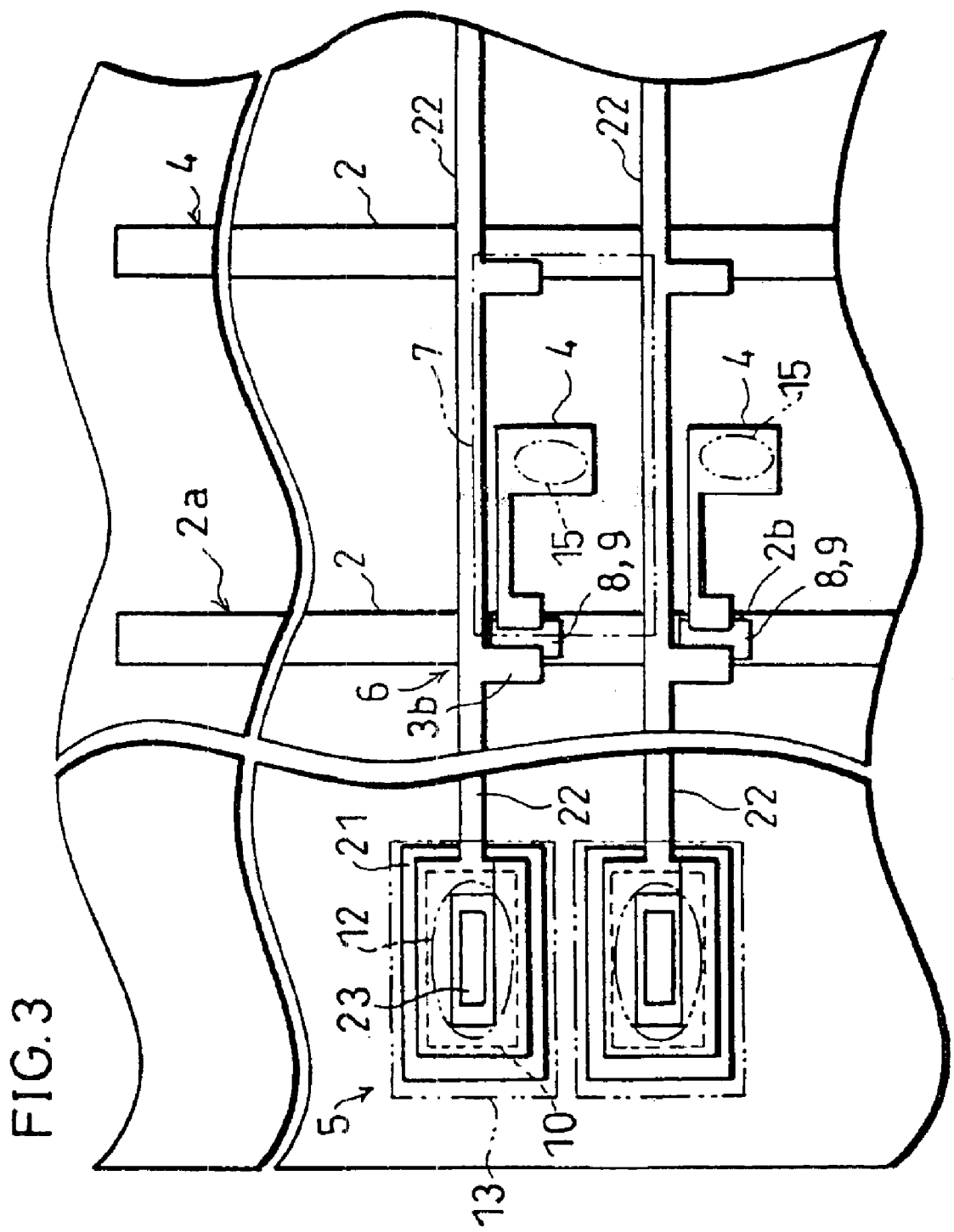
FIG. 3 is a plan view that shows a construction of a TFT array substrate in which an island-shape semiconductor layer has a doughnut-shape, in the liquid crystal display of FIG. 1(a).

Here, the above explanation has exemplified a case in which the island-shape semiconductor layer has a simple shape (a shape shown in FIG. 1(a)). However, not limited to the shape as shown in FIG. 1(a), the shape of the island-shape semiconductor layer is preferably designed into a shape (doughnut shape) which covers (surrounds) the entire periphery of the terminal section contact hole 12 as shown in FIG. 3. In this case, the source wire 22, placed on the island-shape semiconductor layer (film, semiconductor layer) 21 having a doughnut shape, is also into the same shape as the doughnut-shaped island-shape semiconductor layer 21.

The signal inputted from outside is transmitted through a path consisting of the source signal input terminal 10, the connection electrode 13 and the source wire 22. In the island-shape semiconductor layer 21 of the doughnut type, the connection width (corresponding to the length of the inner circumference 23 of the island-shape semiconductor layer 21 of the doughnut type) through which the input signal is transmitted to the connection electrode 13 is widened so that it is possible to reduce the connection resistance. In other words, the island-shape semiconductor layer 21 formed into the doughnut shape makes it possible to reduce the connection resistance, thereby achieving better conduction between the source wire 22 and the source signal input terminal 10. Here, the island-shape semiconductor layer 21 formed into a doughnut shape also makes it possible to prevent the connection electrode 13 from having a step discontinuity, in the same manner as in the case of the island-shape semiconductor layer 11 having the shape shown in FIG. 1(a). Moreover, the island-shape semiconductor layer 21 of this type is made by only changing the shape of the island-shape semiconductor layer 11; therefore, the materials, etc. used therein are the same as those of the island-shape semiconductor layer 11.

Figure 4:
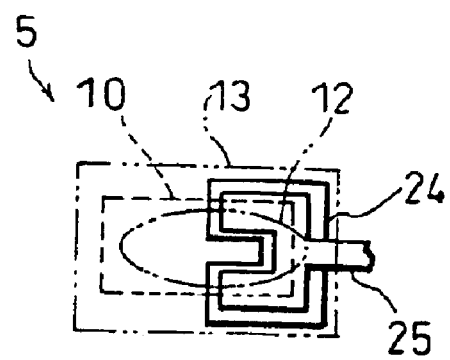
FIG. 4 is a plan view that shows a construction of a TFT array substrate in which an island-shape semiconductor layer has a U-letter-shape, in the liquid crystal display of FIG. 1(a).

Moreover, with respect to the island-shape semiconductor layer for decreasing the resistance at the time when the input signals are transmitted through the connection electrode 13, not limited to the above-mentioned doughnut type, a U-letter-type island-shape semiconductor layer (film, semiconductor layer) 24, placed on the periphery of the terminal section contact hole 12 as shown in FIG. 4, may be adopted. Such a U-letter-type island-shape semiconductor layer 24 also makes it possible to achieve the same functions and effects as those of the doughnut type. Here, in the case of the U-letter type also, the source wire 25 has the same shape as the island-shape semiconductor layer 24 (in this case, the U-letter shape). Additionally, a square-type island-shape semiconductor layer, which can widen the connection width through which the input signals are transmitted to the connection electrode 13, may be used with the same functions and effects.

In the case when the island-shape semiconductor layer 21 has the doughnut shape placed on the entire periphery of the terminal section contact hole 12 as described above, on the assumption that the terminal section contact hole 12 has the same area, if the extended portion of the island-shape semiconductor layer 21 into the terminal section contact hole 12 is too long, there will be a problem in which most of the inside portion of the terminal section of the contact hole 12 is covered with the island-shape semiconductor layer 21 due to defective photolithographic processes in the island-shape semiconductor layer 21.

Figure 5A:
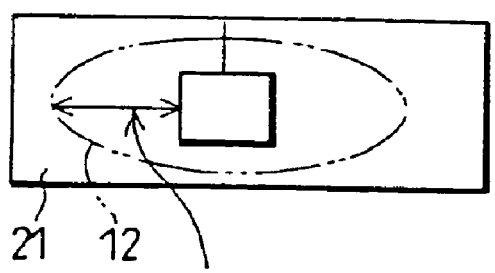
FIG. 5(a) is an explanatory drawing that shows a case in which the area of an extending portion of the island-shape semiconductor layer into the terminal section contact hole is large, in the liquid crystal display of FIG. 1(a).
Figure 5B:
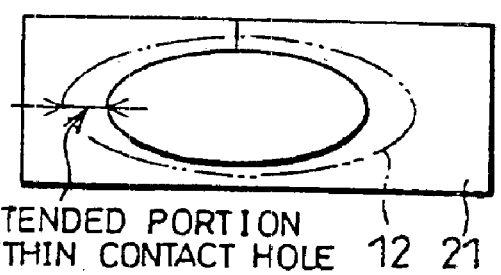
FIG. 5(b) is an explanatory drawing that shows a case in which the area of an extending portion of the island-shape semiconductor layer into the terminal section contact hole is small, in the liquid crystal display of FIG. 1(a).
Figure 6:
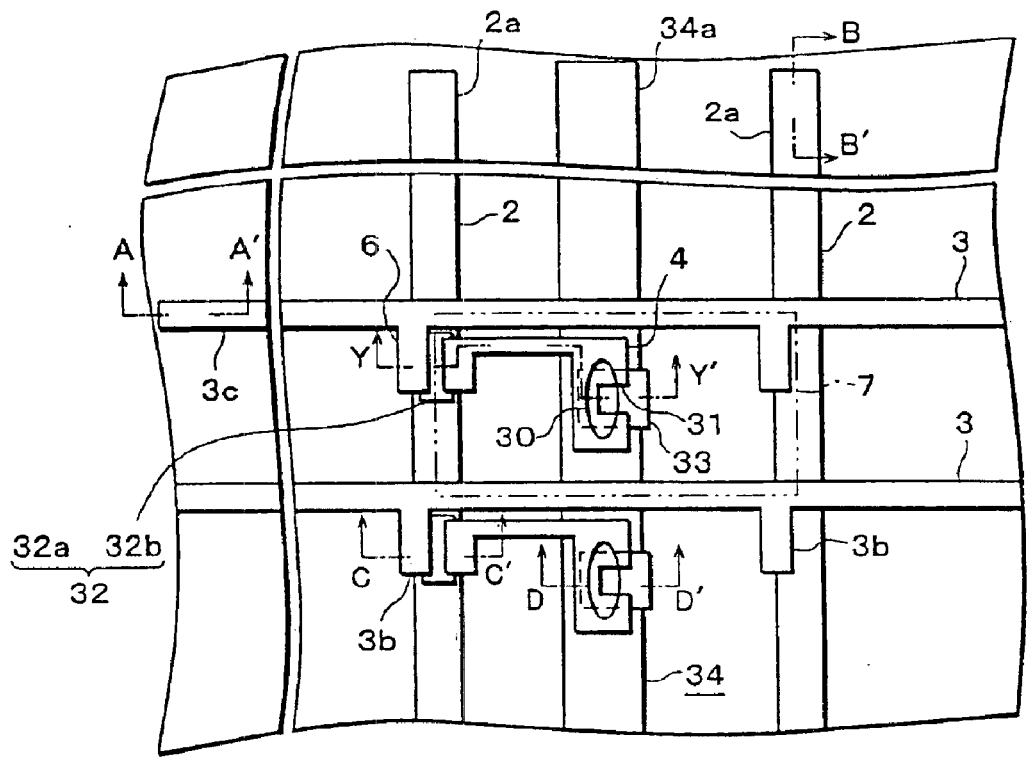
FIG. 6(a) is a plan view that shows the structure of a liquid crystal display in accordance with another embodiment of the present invention.
FIG. 6(b) is a cross-sectional view taken along line Y–Y' of FIG. 6(a).
Figure 6:
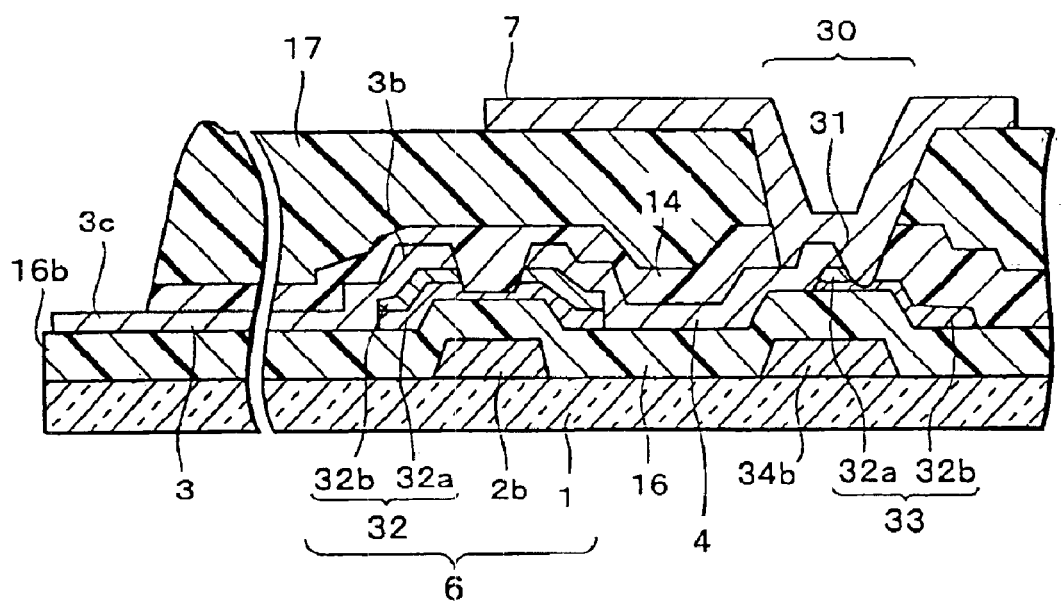
Figure 7:
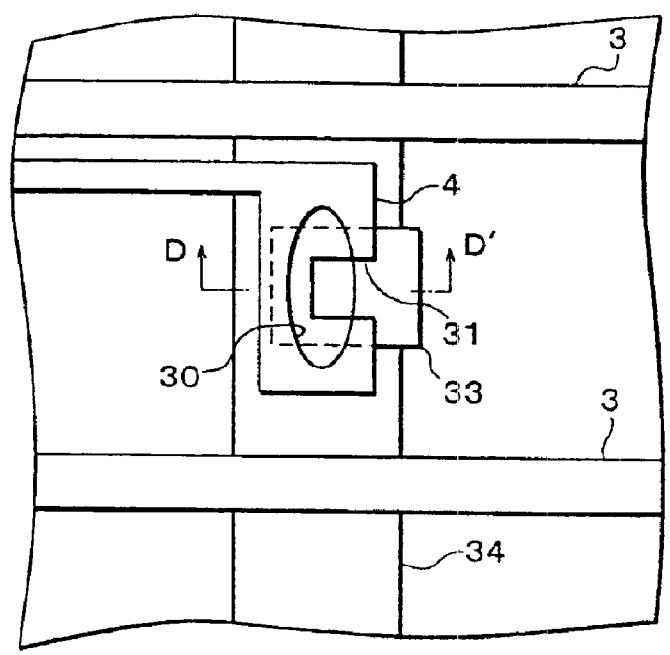
FIG. 7(a) is a plan view that shows a portion in the vicinity of line D–D' of FIG. 6(a).
FIG. 7(b) is a cross-sectional view taken along line D–D' of FIG. 6(a).
Figure 7:
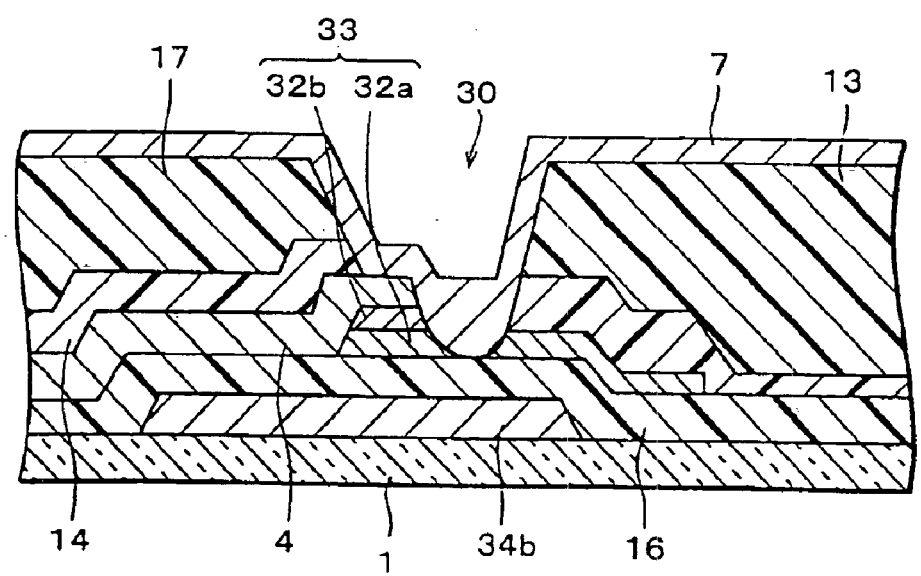
Figure 8A:
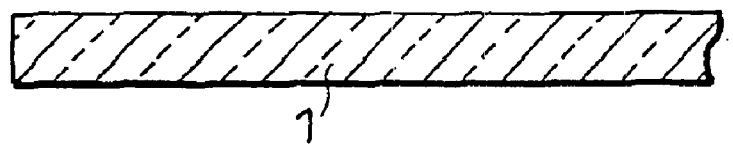
FIG. 8(a), which is a cross-sectional view taken along line A–A' of FIG. 6(a), shows a manufacturing process for forming a gate electrode on an insulation substrate in the liquid crystal display of FIG. 6(a).
Figure 8B:
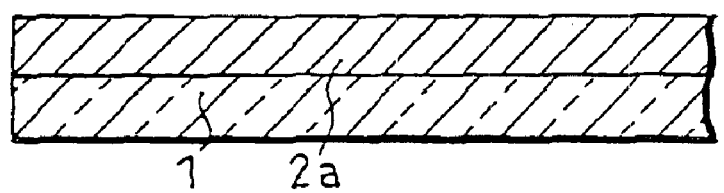
FIG. 8(b), which is a cross-sectional view taken along line B–B' of FIG. 6(a), shows the manufacturing process for forming a gate electrode on an insulation substrate in the liquid crystal display of FIG. 6(a).
Figure 8C:
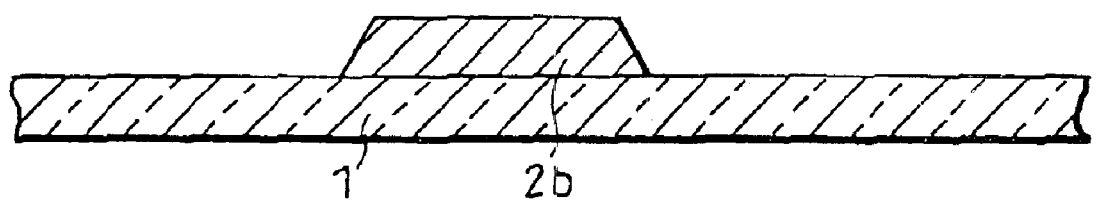
FIG. 8(c), which is a cross-sectional view taken along line C–C' of FIG. 6(a), shows the manufacturing process for forming a gate electrode on an insulation substrate in the liquid crystal display of FIG. 6(a).
Figure 8D:
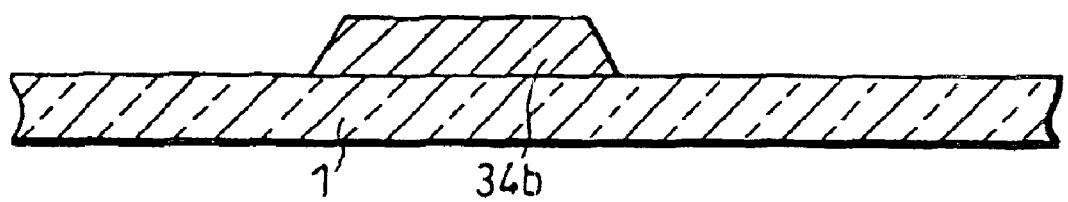
FIG. 8(d), which is a cross-sectional view taken along line D–D' of FIG. 6(a), shows the manufacturing process for forming a gate electrode on an insulation substrate in the liquid crystal display of FIG. 6(a).

More specifically, the size limitation is often imposed on TFT panels, and in many cases, the patterns need to be designed with a minimum area. In these cases, it is not possible to provide the terminal section contact hole 12 with a large area. On the assumption of the terminal section contact holes 12 having the same area, when the extended portion of the island-shape semiconductor layer 21 has an appropriate length, it is possible to form a sufficient opening section of the island-shape semiconductor layer 21 as shown in FIG. 5(b); however, when the extended portion of the island-shape semiconductor layer 21 is too long, it is not possible to maintain a sufficient opening section of the island-shape semiconductor layer 21 as shown in FIG. 5(a), and this arrangement tends to cause defects in the photopattern.

As described above, when the extended portion of the island-shape semiconductor layer 21 is too long, the gate insulation film 16 remains inside the terminal section contact hole 12 during the etching process at the time of formation of the terminal section contact hole 12, making it difficult to provide conduction between the source wire 22 and the source signal input terminal 10.

Moreover, as described above, the objective of the formation of the doughnut-type island-shape semiconductor layer 21 is to widen the connection width that allows the input signals to pass through the connection electrode 13. Therefore, the longer the length of the inner circumference 23 of the doughnut shape of the island-shape semiconductor layer 21, that is, the shorter the extended portion of the island-shape semiconductor layer 21 into the terminal section contact hole 12, the higher the effects obtained.

Therefore, in the case of the doughnut-type island-shape semiconductor layer 21 also, it is preferable to design the size of the island-shape semiconductor layer 21 in a manner so as to further extend 0.5 to 10 μm from the end of the source wire 3 to the inside of the terminal section contact hole 12.

Here, in the present embodiment, with respect to the island-shape semiconductor layers 11, 21 and 24, the films which are manufactured in the same process as the semiconductor operation layer (a-Si layer 8 and n$^+$a-Si layer 9) of the TFT 6 are used; however, any film made of another material may be formed as long as a ratio of etching rate of 1/2 to 1/20 of the gate insulation film 16 is maintained.

Additionally, in the present embodiment, upon etching and removing the gate insulation film 16 and the protective film 14 in the process (7), the resin layer 17 is used as a mask; however, photoresist, etc., which is separated and removed in the following process, may be used in place of the resin layer 17, and in this case also, the same effects can be obtained.

Moreover, in the present embodiment, the island-shape semiconductor layer 11 is applied to the source signal input terminal section 5; however, the same construction may be applied, for example, to the input terminal section of the supplementary capacitance wire, thereby making it possible to improve the reliability of the connection.

Moreover, in the present embodiment, the material which is not susceptible to etching at all is used as the source wires 3, 22, 25 and the source signal input terminal 10; however, any material can be used as long as it has an etching rate that is slower than 1/5 of the etching rates of the gate insulation film 16 and the protective film 14.

[Embodiment 2]

Referring to FIGS. 6(a) and 6(b) through FIGS. 13(a) to 13(d), the following description will discuss another embodiment of the present invention. Here, for convenience of explanation, those members that have the same functions as those shown in the drawings of the embodiment 1 are indicated by the same reference numerals, and the description thereof is omitted.

As illustrated in FIGS. 6(a) and 6(b), the liquid crystal display of the present embodiment is formed as follows: First, a TFT 6 having a source electrode 3b and a drain electrode 4 for providing switching operations to the pixels and a protective film(protective film layer) 14 and a resin layer 17 are stacked thereon. After having formed a contact hole 30 in the resin layer (resin insulation film) 17, the protective film 14 below this contact hole 30 is etched and removed, and an image display electrode 7 for applying a voltage to the liquid crystal is placed in the corresponding area of the contact hole 30 in a manner so as to contact the drain electrode 4.

In particular, as illustrated in FIGS. 7(a) and 7(b), in order to prevent disconnection occurring in the image display electrode 7 when it is manufactured, a cut-out section 31 is formed so as to allow the drain electrode 4 in the area of the contact hole 30 to face the lower layer, and upon forming the TFT section island-shape semiconductor layer 32 so as to form the TFT 6, a hole section island-shape semiconductor layer 33 is formed as a dummy also in the area of the contact hole 30.

An explanation will be given of the manufacturing method of the above-mentioned liquid crystal display.

As illustrated in FIGS. 8(a) through 8(d), first, a metal thin film, composed of Ti, Al, or Cr, etc., is formed on a washed insulation substrate 1 made of glass or other materials by sputtering, etc. Then, a resist pattern is formed through, for example, photolithographic processes in which a resist coating process, an exposing process and a developing process are carried out, and this is then subjected to a dry or wet etching process so as to form a pattern.

Next, the following members are formed: a gate electrode 2b, a gate wire 2 (see FIG. 6(a)) connected to the gate electrode 2b as a gate line, a gate signal input terminal 2a connected to the gate wire 2, a supplementary capacitance electrode 34b, a supplementary capacitance wire 34 (see FIG. 6(a)) connected to the supplementary capacitance electrode 34b as a supplementary capacitance line, and a supplementary capacitance signal input terminal 34a (see FIG. 6(a)) connected to the supplementary capacitance wire 34 as a supplementary capacitance input terminal.

Next, as illustrated in FIGS. 9(a) through 9(d), a gate insulation film 16, made from $SiN_x$, is formed on the entire surface of the insulation film 1 by using a mixed gas of $SiH_4/NH_3/N_2$ through a P-CVD method.

As illustrated in FIGS. 9(a), 9(b) and FIGS. 6(a), 6(b), the terminal section area of the gate insulation film 16 forms a gate insulation film terminal section 16b. For this reason, the gate insulation film 16 is allowed to remain as the gate insulation film terminal section 16b on the gate signal input terminal 2a serving as the driving circuit input terminal section, the supplementary capacitance signal input terminal 34a and the source signal input terminal 3c.

Figure 9A:
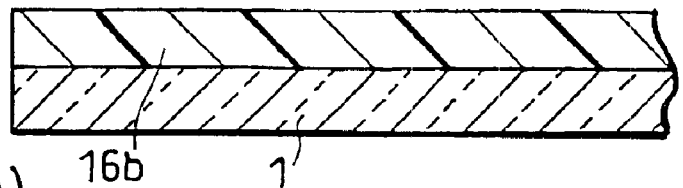
FIG. 9(a), which is a cross-sectional view taken along line A–A' of FIG. 6(a), shows manufacturing processes through which the island-shape semiconductor layer of the TFT section and the island-shape semiconductor layer of the hole section have been formed in the liquid crystal display of FIG. 6(a).
Figure 9B:
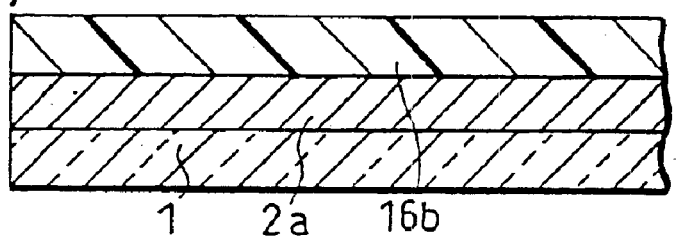
FIG. 9(b), which is a cross-sectional view taken along line B–B' of FIG. 6(a), shows manufacturing processes through which the island-shape semiconductor layer of the TFT section and the island-shape semiconductor layer of the hole section have been formed in the liquid crystal display of FIG. 6(a).
Figure 9C:
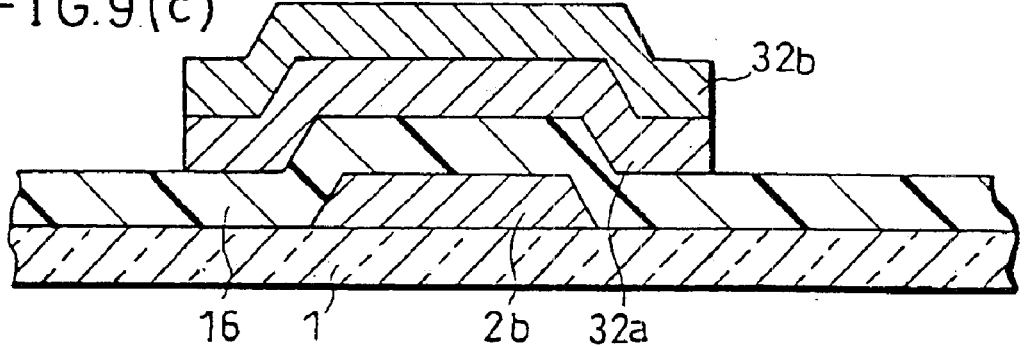
FIG. 9(c), which is a cross-sectional view taken along line C–C' of FIG. 6(a), shows manufacturing processes through which the island-shape semiconductor layer of the TFT section and the island-shape semiconductor layer of the hole section have been formed in the liquid crystal display of FIG. 6(a).

As illustrated in FIG. 9(c), a-Si film 32a, which serves as an a-Si layer made of an intrinsic amorphous silicon, and an n$^+$a-Si film 32b, which serves as a n$^+$a-Si layer doped with phosphor (P) forming an ohmic contact layer, are formed thereon by using a P-CVD method in the same manner.

At this time, in the case of the a-Si film 32a, $SiH_4$ or $H_2$ is used as a material gas, and in the case of the n$^+$a-Si film 32b, $SiH_4$ or $H_2$ in which 0.5% of $PH_3$ gas is mixed is used.

Figure 9D:
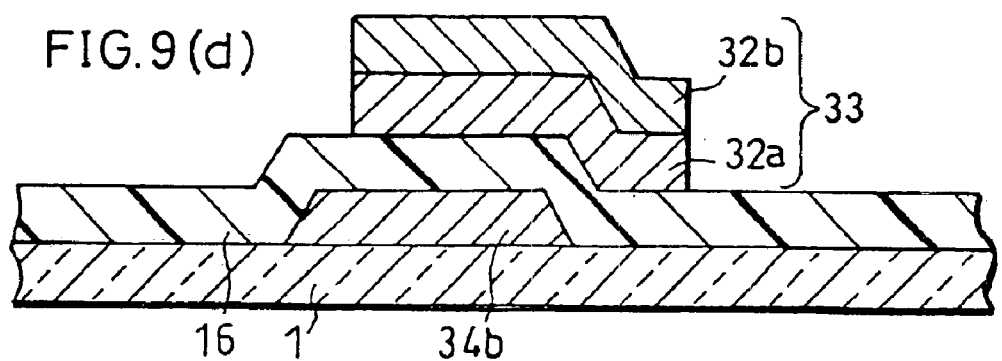
FIG. 9(d), which is a cross-sectional view taken along line D–D' of FIG. 6(a), shows manufacturing processes through which the island-shape semiconductor layer of the TFT section and the island-shape semiconductor layer of the hole section have been formed in the liquid crystal display of FIG. 6(a).

The a-Si film 32a and the n$^+$a-Si film 32b, thus formed, are patterned into a TFT section island-shape semiconductor layer 32 serving as a first island-shape semiconductor layer (a first semiconductor layer) made of a-Si film 32a and n$^+$a-Si film 32b, in a manner so as to superpose on the gate electrode 2b by using a photolithography method, etc., and simultaneously with this, as illustrated in FIG. 9(d), a hole section island-shape semiconductor layer 33, which serves as a second island-shape semiconductor layer (a second semiconductor layer) made from amorphous silicon, is formed, with its one portion being superposed on the supplementary capacitance electrode 34b through the gate insulation film 16.

Next, as illustrated in FIGS. 10(a) to 10(d), a metal thin film made of Ti, Al, Cr, etc. is formed on the entire surface of the substrate, and this is subjected to a photolithography method so that the following members are formed: a drain electrode 4 with its one end being superposed on the TFT section island-shape semiconductor layer 32, a source electrode 3b, a source wire 3 connected to the source electrode 3b, and a source signal input terminal 3c connected to the source wire 3b. A TFT 6 is formed by these source wire 3, the source electrode 3b and the source signal input terminal 3c that are integral with the source wire 3, and the drain electrode 4.

In this case, as illustrated in FIGS. 7(a) and 7(b), the drain electrode 4 has its end overlapped with the hole section island-shape semiconductor layer 33 on the above-mentioned supplementary capacitance electrode 34b, has the cut-out section 31 formed in the overlapped portion with the hole section island-shape semiconductor layer 33, and also has its shape formed into the shape of the cut-out section 31 with its one portion overlapped with the hole section island-shape semiconductor layer 33 so that it is patterned with one portion of the hole section island-shape semiconductor layer 33 being exposed. Here, in the present embodiment, the cut-out section 31 is formed in the drain electrode 4; however, not limited to this arrangement, for example, it may be formed as a through hole that communicates with the lower layer.

Figure 10A:
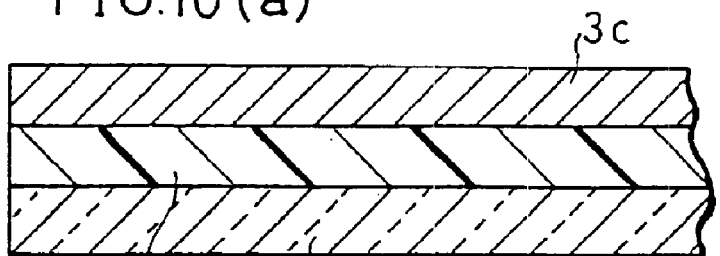
FIG. 10(a), which is a cross-sectional view taken along line A–A' of FIG. 6(a), shows manufacturing processes through which the TFT has been formed in the liquid crystal display of FIG. 6(a).
Figure 10B:
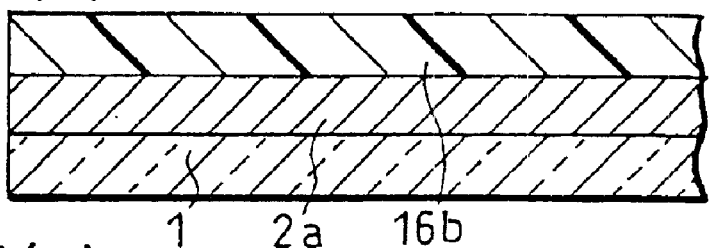
FIG. 10(b), which is a cross-sectional view taken along line B–B' of FIG. 6(a), shows manufacturing processes through which the TFT has been formed in the liquid crystal display of FIG. 6(a).
Figure 10C:
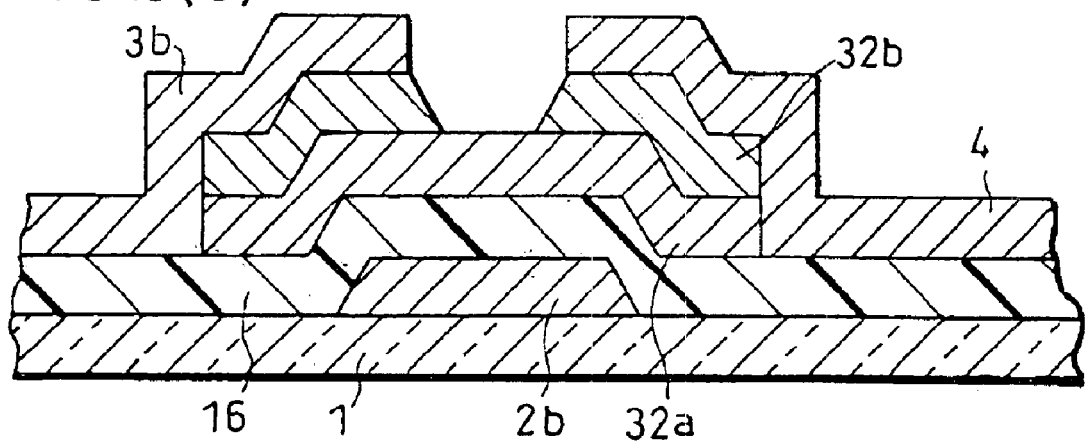
FIG. 10(c), which is a cross-sectional view taken along line C–C' of FIG. 6(a), shows manufacturing processes through which the TFT has been formed in the liquid crystal display of FIG. 6(a).
Figure 10D:
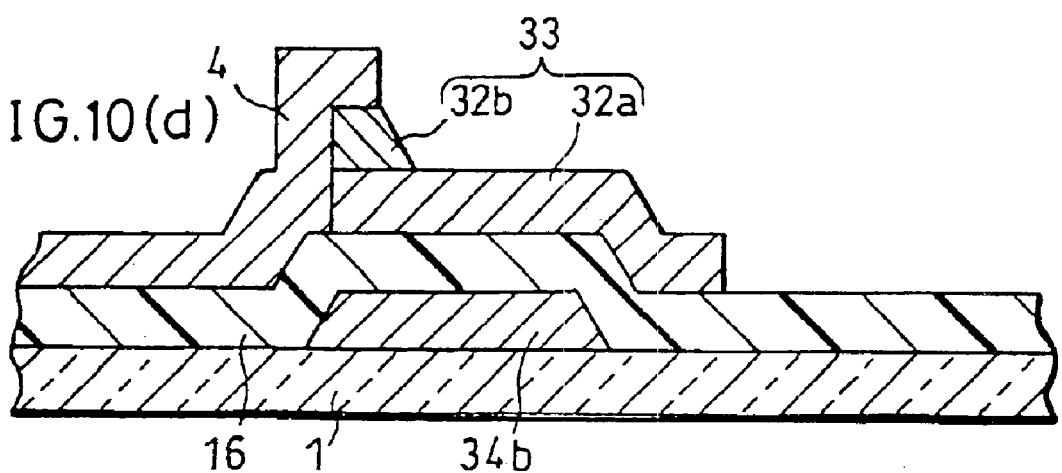
FIG. 10(d), which is a cross-sectional view taken along line D–D' of FIG. 6(a), shows manufacturing processes through which the TFT has been formed in the liquid crystal display of FIG. 6(a).

Next, as illustrated in FIGS. 10(a) through 10(d), the n⁺a-Si film 32b of the hole section island-shape semiconductor layer 33, exposed from the drain electrode 4 that has the cut-out section 31 or a through-hole shape pattern on the supplementary capacitance electrode 34b, is etched and removed. Simultaneously with this process, as illustrated in FIG. 10(d), the drain electrode 4, which is formed with its end overlapped with the hole section island-shape semiconductor layer 33 above the supplementary capacitance electrode 34b, is used as a mask, and the n⁺a-Si film 32b of the hole section island-shape semiconductor layer 33 is etched and separated.

Successively, as illustrated in FIGS. 11(a) through 11(d), a protective film 14 made from $SiN_x$, which serves as a first protective film, is formed on the entire surface of each of the substrates shown in FIGS. 10(a) through 10(d) by using a mixed gas of $SiH_4$, $NH_3$ and $N_2$ through a P-CVD method.

A resin layer 17 made from a photosensitive acrylic resin having an insulation property is coated on the entire surface of the above-mentioned protective film 14 by a spin coating method, etc., and this is then exposed by using an exposing device at areas corresponding to a predetermined pattern of the mask, and subjected to a developing process so as to remove the exposed areas of the resin layer 17.

Figure 11A:
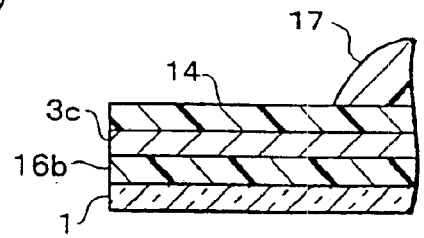
FIG. 11(a), which is a cross-sectional view taken along line A–A' of FIG. 6(a), shows manufacturing processes through which a resin layer has been formed in the liquid crystal display of FIG. 6(a).
Figure 11B:
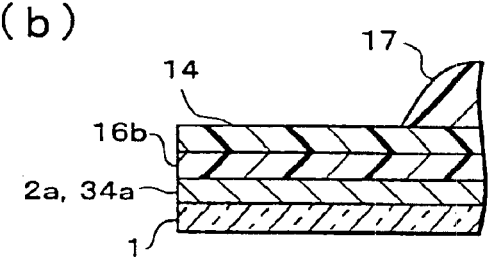
FIG. 11(b), which is a cross-sectional view taken along line B–B' of FIG. 6(a), shows manufacturing processes through which the resin layer has been formed in the liquid crystal display of FIG. 6(a).
Figure 11C:
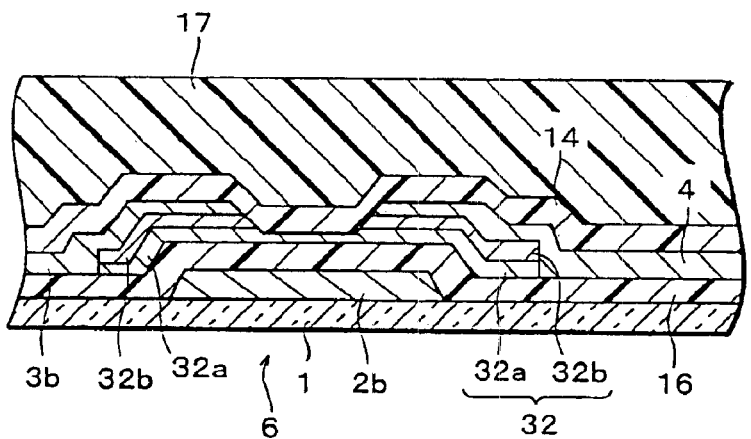
FIG. 11(c), which is a cross-sectional view taken along line C–C' of FIG. 6(a), shows manufacturing processes through which the resin layer has been formed in the liquid crystal display of FIG. 6(a).
Figure 11D:
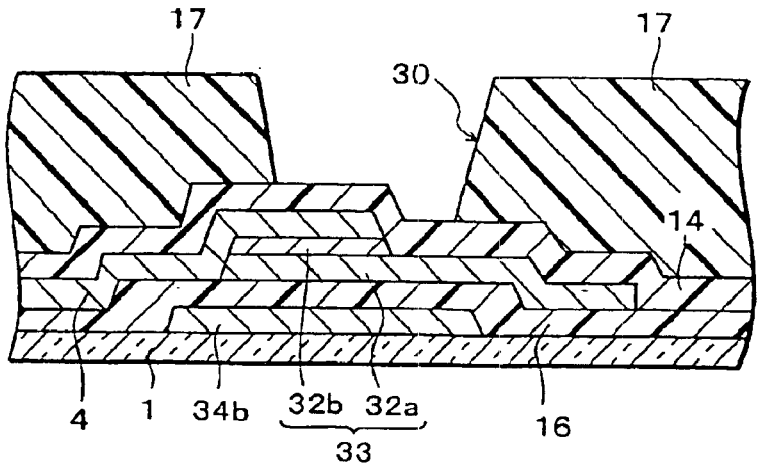
FIG. 11(d), which is a cross-sectional view taken along line D–D' of FIG. 6(a), shows manufacturing processes through which the resin layer has been formed in the liquid crystal display of FIG. 6(a).

After these processes, on the resin layer 17, a contact hole 30 is formed as a pattern made by removing only the upper layer of the gate signal input terminal 2a, the supplementary capacitance signal input terminal 34a, the source signal input terminal 3c and the drain electrode 4, and as illustrated in FIG. 11(d), this is then subjected to processes such as a heating process, etc., so as to cure the resin layer 17.

Here, as illustrated in FIG. 7(a), the cut-out section 31 is formed in the drain electrode 4 as described earlier, and the drain electrode 4 is placed in a positional relationship so as to traverse the contact hole 30.

Moreover, the area surrounded by the side face of the contact hole 30 and the edge of the cut-out section 31 of the drain electrode 4 is allowed to have a structure to which the hole section island-shape semiconductor layer 33 is exposed.

Furthermore, the area of the exposed hole section island-shape semiconductor layer 33 is preferably set so as to account for approximately 1/3 to 2/3 of the area of the contact hole 30, and in the case when the area is too large, since the drain electrode 4 also serves as the support capacitor, there will be degradation in the display quality of the finished liquid crystal display due to deviations in the turned-over film thickness of the hole section island-shape semiconductor layer 33 that has been etched.

Figure 15:
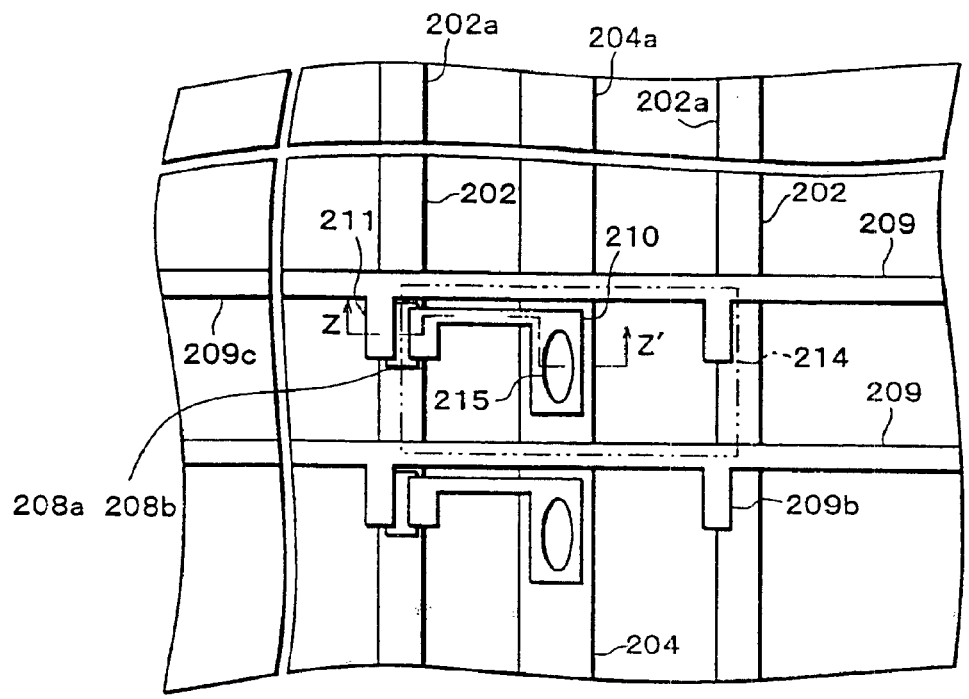
FIG. 15(a) is a plan view that shows another example of the structure of a conventional liquid crystal display.
FIG. 15(b) is a cross-sectional view taken along line Z–Z' of FIG. 15(a).
Figure 15:
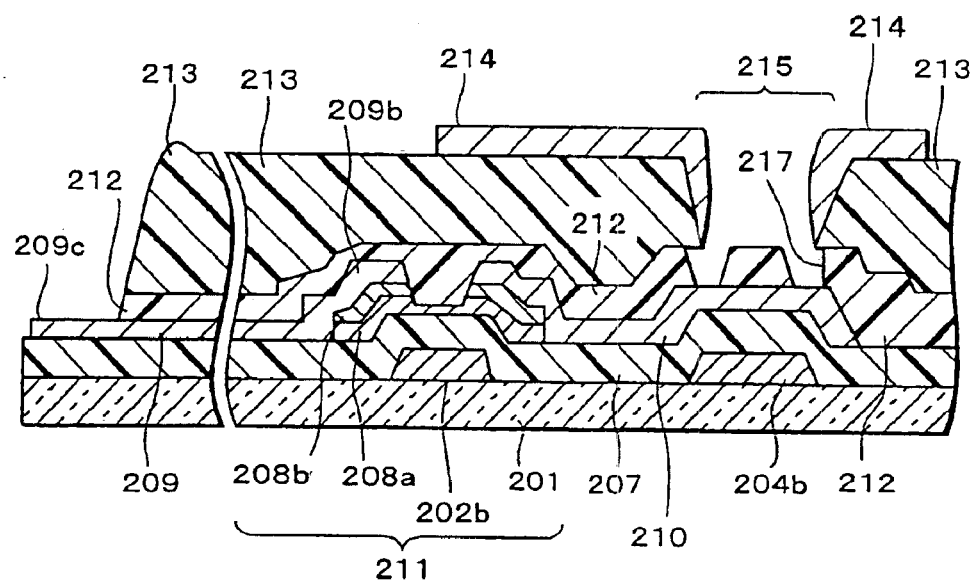

Moreover, if the area is too small, it is not possible to obtain the originally expected effects, and upon providing conduction in an image display electrode 7 which will be described later, as illustrated in FIG. 15(b), the small area causes a reversely-tapered shape 217 of the contact hole 215, resulting in a problem of disconnection.

In the arrangement as described above, as illustrated in FIGS. 12(a) through 12(d), the protective film 14 in the source signal input terminal 3c area of the source wire 3 and the gate insulation film terminal section 16b are continuously etched by using a mixed gas of $CF_4$ and $O_2$ through a dry etcher in the RIE mode. Simultaneously with this process, the inside of the contact hole 30 is also dry-etched.

The above-mentioned contact hole 30 is formed on the drain electrode 4 formed above the supplementary capacitance electrode 34b through the gate insulation film 16 and the hole section island-shape semiconductor layer 33. Moreover, the drain electrode 4 is provided with the cut-out section 31, and the hole section island semiconductor layer 33 one portion of which is exposed to the cut-out section 31 of the drain electrode 4 on the bottom section within the contact hole 30 is allowed to serve as an etching stopper, with the result that the gate insulation film 16 below this is allowed to remain; however, the protective film 14 on the source signal input terminal 3c that is an external input terminal is etched and removed.

Figure 12A:
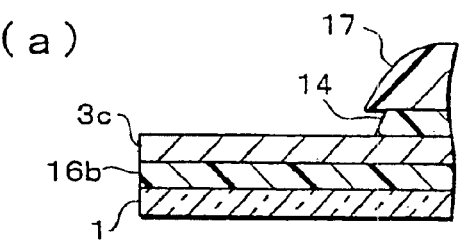
FIG. 12(a), which is a cross-sectional view taken along line A–A' of FIG. 6(a), shows manufacturing processes through which a contact hole has been formed and subjected to an etching process in the liquid crystal display of FIG. 6(a).
Figure 12B:
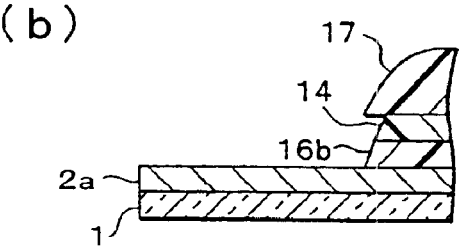
FIG. 12(b), which is a cross-sectional view taken along line B–B' of FIG. 6(a), shows manufacturing processes through which the contact hole has been formed and subjected to an etching process in the liquid crystal display of FIG. 6(a).
Figure 12C:
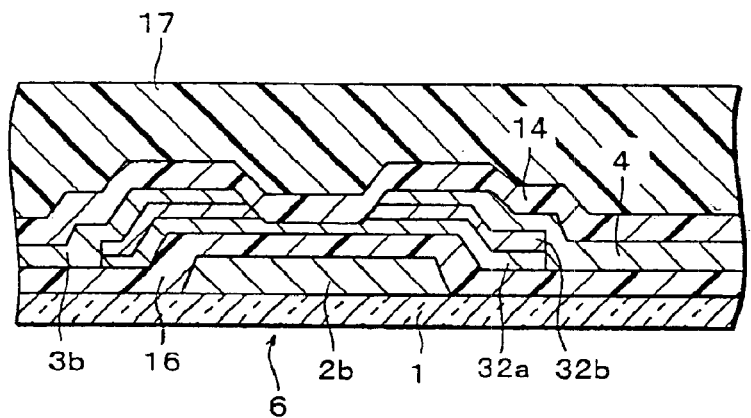
FIG. 12(c), which is a cross-sectional view taken along line C–C' of FIG. 6(a), shows manufacturing processes through which the contact hole has been formed and subjected to an etching process in the liquid crystal display of FIG. 6(a).

Moreover, as illustrated in FIG. 12(a), the gate insulation film terminal section 16b and the protective film 14 on the gate signal input terminal 2a are simultaneously etched and removed.

As described above, as illustrated in FIGS. 12(a), 12(b) and 12(d), in the TFT array substrate in the present embodiment, the resin layer 17, the source signal input terminal 3c connected to the source wire 3 and the drain electrode 4, are allowed to serve as masks by which the protective film 14 and the gate insulation film terminal section 16b are etched and removed, which forms a major feature of the present invention. Thus, it becomes possible to reduce the number of masks.

In other words, the protective film 14 and the gate insulation film terminal section 16b are simultaneously patterned by using the resin layer 17 as a mask, that is, by using the same mask pattern; thus, it becomes possible to eliminate a mask pattern for etching the protective film 14 and a mask pattern for etching the gate insulation film terminal section 16b. In conventional methods, this arrangement has not been put into practical use since a step discontinuity occurs in the pixel display electrode 7 of the contact hole 30; however, in the present embodiment, the protective film 14 and the gate insulation film terminal section 16b can be continuously etched by using the resin layer 17 as a mask, thereby making it possible to cut two masks.

Moreover, in the conventional arrangements, as illustrated in FIG. 15(a), within the contact hole 215, the material for the source wire 209 forming the drain electrode 210 is not etched at all while the edge area of the gate insulation film 207 is etched, with the result that the overcoat layer 212 thereon is side-etched rapidly to form a reversely-tapered shape 217.

Figure 12D:
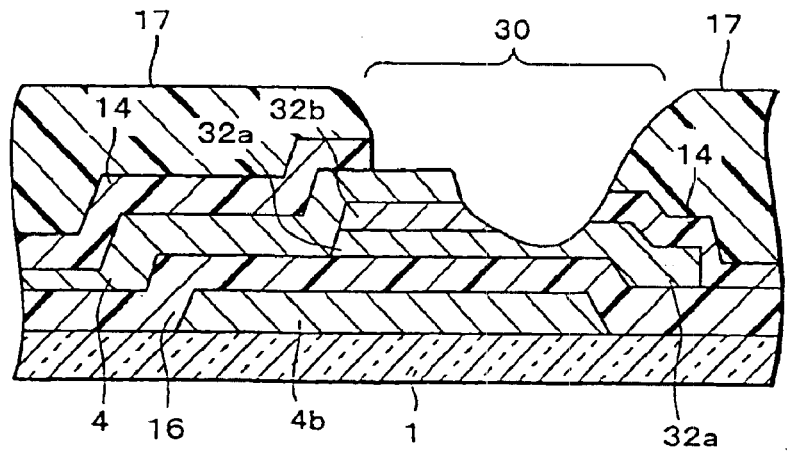
FIG. 12(d), which is a cross-sectional view taken along line D–D' of FIG. 6(a), shows manufacturing processes through which the contact hole has been formed and subjected to an etching process in the liquid crystal display of FIG. 6(a).
Figure 13:
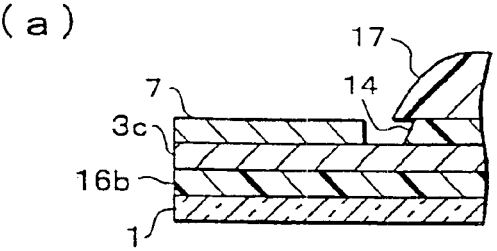
FIG. 13(a), which is a cross-sectional view taken along line A–A' of FIG. 6(a), shows manufacturing processes through which a pixel display electrode has been formed in the liquid crystal display of FIG. 6(a).
FIG. 13(b), which is a cross-sectional view taken along line B–B' of FIG. 6(a), shows manufacturing processes through which the pixel display electrode has been formed in the liquid crystal display of FIG. 6(a).
FIG. 13(c), which is a cross-sectional view taken along line C–C' of FIG. 6(a), shows manufacturing processes through which the pixel display electrode has been formed in the liquid crystal display of FIG. 6(a).
FIG. 13(d), which is a cross-sectional view taken along line D–D' of FIG. 6(a), shows manufacturing processes through which the pixel display electrode has been formed in the liquid crystal display of FIG. 6(a).
Figure 13:
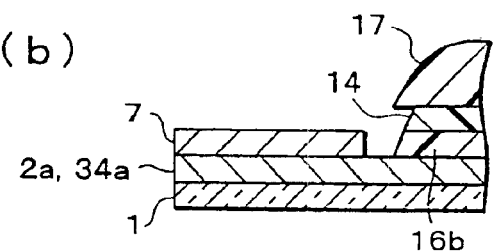
Figure 13:
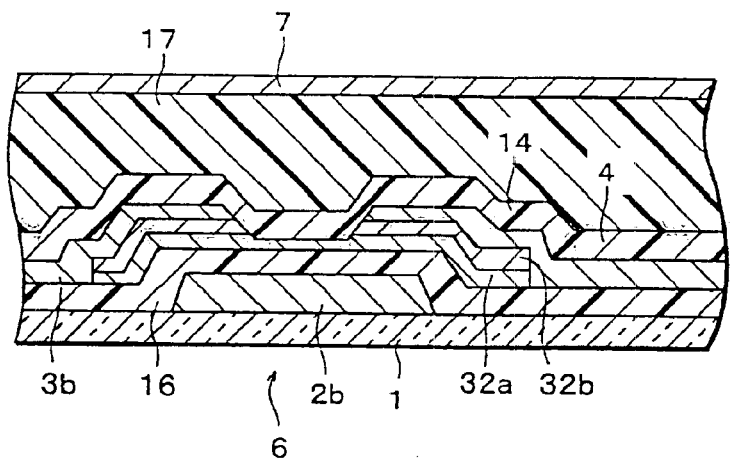
Figure 13:
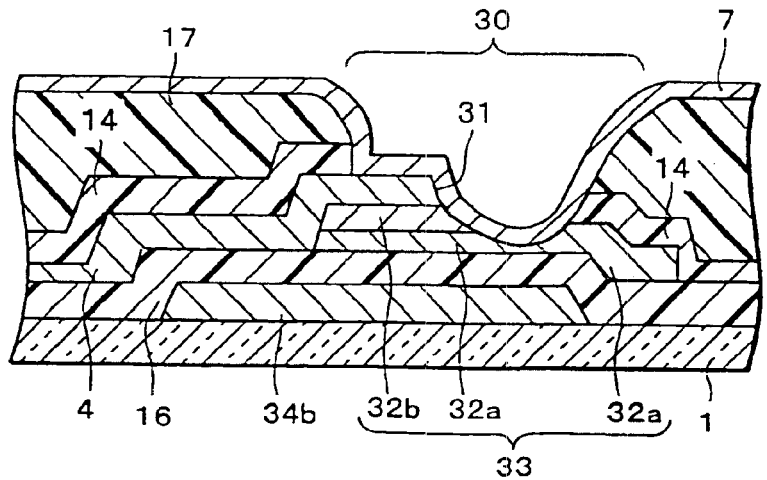
Figure 14:
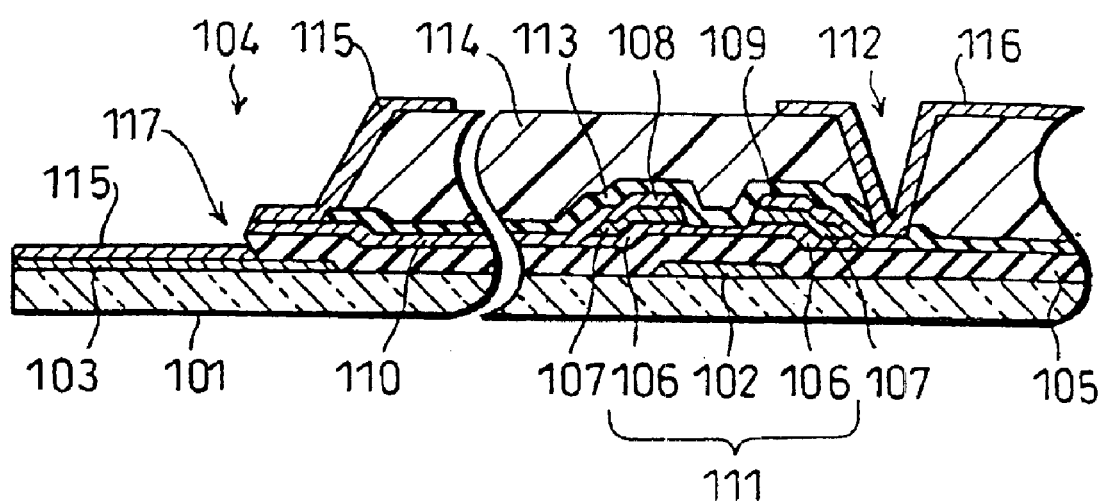
FIG. 14 is a cross-sectional view that shows one example of the structure of a conventional liquid crystal display.

However, in the present embodiment, the hold section island-shape semiconductor layer 33 is exposed from the cut-out section 31 installed in the drain electrode 4; therefore, the hole section island-shape semiconductor layer 33 is etched within the contact hole 30 even during the etching process of the gate insulation film 16 on the upper layer of the input terminal. Consequently, as illustrated in FIG. 12(d), the invasion into the resin layer 17 is minimized so that the protective film 14 can be etched to form a forwardly-tapered shape under the resin layer 17.

Lastly, as illustrated in FIGS. 13(a) through 13(d), a transparent conductive film, for example, made of ITO (Indium Tin Oxide), which forms a pixel display electrode 7, is formed by using a sputtering method, etc., and this is patterned by a photolithography method, etc., so as to form a pixel display electrode 7 connected to the drain electrode 4. Here, upon forming the pixel display electrode 7, the transparent conductive film is not limited to ITO, and, for example, a non-light-transmitting conductive film made from Al, Ag, etc., may be formed as a display electrode of the reflection type.

Moreover, not illustrated in the Figures, an alignment film is formed on an active matrix substrate formed as described above, an opposing electrode is formed and a liquid crystal material is interpolated between the active matrix substrate and a color filter substrate formed by placing an alignment film on the opposing electrode.

As illustrated in FIG. 6(b), in the above-mentioned manufacturing method, it is possible to prevent the reversely-tapered shape from occurring in the connection portion within the contact hole 30; therefore, it becomes possible to connect the drain electrode 4 and the pixel display electrode 7 without any step discontinuity.

Here, the cut-out section 31 is placed in a manner so as to traverse the contact hole 30; therefore, even when the protective film 14 enters the inside of the resin layer 17 at the peripheral portion of the contact hole 30 on the drain electrode 4, the edge of the contact hole 30 on the hole portion island semiconductor layer 33 exposed from the cut-out section 31 is allowed to form a forwardly-tapered shape under the condition that the hole section island-shape semiconductor layer 33 has an etching rate (1/3 to 1/5) that is slower than that of the gate insulation film terminal section 16b; therefore, it is possible to provide conduction from this side, and consequently to ensure the reliability.

Moreover, under the condition that the hole section island-shape semiconductor layer 33 has an etching rate slower than the gate insulation film terminal section 16b, it is also possible to protect the gate insulation film 16 located under it.

In this manner, in the manufacturing method of the liquid crystal display of the present embodiment, first, the TFT 6 which is provided with the source electrode 3b and the drain electrode 4 for providing switching operations to the pixels is formed, and the protective film 14 and the resin layer 17 are stacked thereon, and the contact hole 30 is formed in the resin layer 17. Thereafter, the protective film 14 below this contact hole 30 is etched and removed, and an image display electrode 7 for applying a voltage to the liquid crystal is placed in the corresponding area of the contact hole 30 in a manner so as to contact the drain electrode 4.

Here, in conventional methods, upon etching the protective film 14 below the contact hole 30, the etching process stops progressing downward at the drain electrode 4 located below, while it starts progressing sideways, with the result that the protective film 14 is etched beyond the area of the contact hole 30.

Consequently, when the pixel display electrode 7 is stacked on the contact hole 30 from above, since the stacked conductor material for forming the pixel display electrode 7 can not tide over the step discontinuity at the area of the protective film 14 on the bottom face of the contact hole 30, resulting in a step discontinuity in the pixel display electrode 7, and the subsequent electrical disconnection in the pixel display electrode 7.

However, in the present embodiment, the cut-out section 31 or a through hole which communicates with the lower layer is formed in the drain electrode 4 in the area of the contact hole 30. Thereafter, upon forming the TFT section island-shape semiconductor layer 8 for providing the TFT 6, the hole section island-shape semiconductor layer 33 is also formed in the area of the contact hole 30. In this case, the hole section island-shape semiconductor layer 33 is formed as a dummy.

In other words, upon forming the TFT section island-shape semiconductor layer 8 for providing the TFT 6, the hole section island-shape semiconductor layer 33 is also formed in the area of the contact hole 30; therefore, upon etching the protective film 14, on the bottom face of the contact hole 30, the protective film 14, the drain electrode 4 having the cut-out section 31 and the hole section island-shape semiconductor layer 33 are stacked in this order from above.

Therefore, when the protective film 14 is etched, first, the protective film 14 is etched, and the etching direction is directed toward the hole section island-shape semiconductor layer 33 that is susceptible to etching so that it is possible to avoid etching in the lateral direction to the protective film 14, and consequently to provide a forwardly-tapered shape.

For this reason, when after the etching process, the conductor material for the pixel display electrode 7 is stacked, the conductor material is not susceptible to a step discontinuity.

As a result, it is possible to provide a manufacturing method of a liquid crystal display which can avoid the occurrence of a step discontinuity in the pixel display electrode 7 and the subsequent disconnection in the pixel display electrode 7.

Moreover, the manufacturing method of the liquid crystal display of the present embodiment is provided with the steps of: forming a gate wire 2, a gate electrode 2b connected to the gate wire 2, a supplementary capacitance wire 34 and a supplementary capacitance electrode 34b connected to the supplementary capacitance wire 34; forming a gate insulation film 16 on the respective gate wire 2, the gate electrode 2b, the supplementary capacitance wire 34 and the supplementary capacitance electrode 34b; forming a TFT section island-shape semiconductor layer 8 made by stacking an a-Si film 32a and an n$^+$a-Si film 32b, above the gate electrode 2b through the gate insulation film 16, as well as simultaneously forming a hole section island-shape semiconductor layer 33 made by stacking an a-Si film 32a and an n$^+$a-Si film 32b, above the supplementary capacitance electrode 34b through the gate insulation film 16; forming a source electrode 3b and a drain electrode 4, each having one end stacked on the TFT section island-shape semiconductor layer 8 above the gate electrode 2b, and a source wire 9 serving as a source line connected to the source electrode 3b, the drain electrode 4 having the other end also stacked on the hole section island-shape semiconductor layer 33 above the supplementary capacitance electrode 34b with the other end being provided with a cut-out section 31 or a through hole; etching and removing the n$^+$a-Si film 32b of the hole section island-shape semiconductor layer 33 above the supplementary capacitance electrode 34b while using the drain electrode 4 having the cut-out section 31 or the through hole as a mask; simultaneously with the etching process of the n$^+$a-Si film 32b of the hole section island-shape semiconductor layer 33 above the supplementary capacitance electrode 34b, etching and separating the n$^+$a-Si film 32b of the TFT section island-shape semiconductor layer 8 while using as masks the source electrode 3b and the drain electrode 4, each having one end stacked on the TFT section island-shape semiconductor layer 8 above the gate electrode 2b; forming a protective film 14 over an entire surface of the substrate; forming a resin layer 17 on the protective film 14; forming a contact hole 30 in the resin layer 17 with the pattern of the cut-out section 31 or the through hole of the drain electrode 4 above the supplementary capacitance electrode 34b being allowed to traverse the contact hole 30 as well as simultaneously removing the resin layer 17 on the source signal input terminal 9c, the gate signal input terminal 2a and the supplementary capacitance signal input terminal 34a; simultaneously etching and removing the protective film 14 on the source signal input terminal 9c, the gate signal input terminal 2a and the supplementary capacitance signal input terminal 34a as well as the protective film 14 on the bottom face section within the contact hole 30, while using as etching masks the patterned resin layer 17 and the pattern of the cut-out section 31 or the through hole of the drain electrode 4 within the contact hole 30; and etching the gate insulation film 16 on the gate signal input terminal 2a and the supplementary capacitance signal input terminal 34a so as to remove the gate insulation film 16 on the gate signal input terminal 2a, as well as simultaneously etching the a-Si film 32a of the hole section island-shape semiconductor layer 33 at a portion thereof exposed to an area surrounded by the cut-out section 31 or the through hole of the drain electrode 4 and the contact hole 30.

Therefore, inside the contact hole 30 in the resin layer 17, the cut-out section 31 or the through hole is formed in the drain electrode 4 in a manner so as to traverse the contact hole 30, and the hole section island-shape semiconductor layer 33 is formed between the drain electrode 4 and the gate insulation film 16 that is the lower layer; thus, the hole section island-shape semiconductor layer 33 has an intermediate etching selectivity between the protective film 14 and the drain electrode 4 so that the etching process is allowed to progress downward to the hole section island-shape semiconductor layer 33, and is not allowed to progress sideways.

For this reason, the etching process provides a forwardly-tapered shape on the bottom face of the contact hole 30; therefore, even when the pixel display electrode 7 is formed from the inside of the contact hole 30 to the surface of the resin layer 17, it is possible to prevent a step discontinuity occurring in the pixel display electrode 7 within the contact hole 30.

Consequently, it is possible to provide a manufacturing method of a liquid crystal display which can prevent the occurrence of a step discontinuity in the pixel display electrode 7 and the subsequent disconnection in the pixel display electrode 7.

Moreover, the following arrangement has not been put into practical use in conventional methods, since a step discontinuity occurs in the pixel display electrode 7 of the contact hole 30; however, in the present embodiment, the protective film 14 and the gate insulation film terminal section 16b can be continuously etched by using the resin layer 17 as a mask, thereby making it possible to cut two masks.

Moreover, in the manufacturing method of a liquid crystal display of the present embodiment, the cut-out section 31 or the through hole, placed in the drain electrode 4 inside the contact hole 30, is formed so as to have at least one portion thereof extended sideways from the area of the contact hole 30.

For this reason, even in the case when a reversely-tapered etching shape occurs between the drain electrode 4 and the hole section island-shape semiconductor layer 33, if there is a relationship between the resin layer 17 and the hole section island-shape semiconductor layer 33 that the hole section island-shape semiconductor layer 33 has an etching rate slower than the resin layer 17, it is possible to form a forwardly-tapered shape, and subsequently to ensure the electrical connection between the drain electrode 4 and the pixel display electrode 7; thus, it also becomes possible to the step discontinuity.

Moreover, in the manufacturing method of a liquid crystal display in accordance with the present embodiment, with respect to the relationship between the a-Si film 32a of the hole section island-shape semiconductor layer 33 exposed to the area surrounded by the cut-out section 31 or the through hole of the drain electrode 4 as well as the edge of the contact hole 30 and the gate insulation film 16 within the area on the gate signal input terminal 2a and the source signal input terminal 9c side, the ratio of the respective etching rates is virtually the same as the ratio of the respective film thicknesses. In other words, the following expression is satisfied: (the etching rate of the a-Si film 32a of the hole section island-shape semiconductor layer 33/the etching rate of the gate insulation film 16) (the thickness of the a-Si film 32a of the hole section island-shape semiconductor layer 33/the film thickness of the gate insulation film 16).

As a result, since the gate insulation film 16 under the hole section island-shape semiconductor layer 33 is subjected to under etching, it is possible to prevent the occurrence of luminescent spots due to leakage between the pixel display electrode 7 and the supplementary capacitance electrode 34b caused by etched gate insulation film 16.

As described above, the liquid crystal display of the present invention, which is provided with an insulation substrate on which a terminal section made of a metal film, an insulation layer formed on the terminal section, having a contact hole formed therein, and wiring made of a metal film formed by placing a connection end portion on the upper portion of the insulation layer, are formed, and in the substrate, the terminal section and the connection end portion of the wiring are connected by a connection conductive film through the contact hole. In this arrangement, a film, which is made of a material having an etching rate slower than that of the insulation layer, and has a shape extended toward the inside of the contact hole from the connection end portion of the wiring, is placed between the insulation layer and the connection end portion of the wire.

Here, consideration is given to a case in which, upon forming a contact hole in an insulation layer, the insulation layer at the formation position of the contact hole is etched and removed by using, for example, the above-mentioned wiring as a mask. In general, the wiring is formed by using a material that is not etched by gas, etc. used at the time of etching the insulation layer. In this case, if the above-mentioned film is not formed, the insulation layer located under the wiring will be selectively etched rapidly through the etching process at the time of the formation of the contact hole. For this reason, the pattern end of the insulation layer will come to have a reversely-tapered shape.

In contrast, in the arrangement of the present invention, the film which has an etching rate slower than that of the insulation layer is placed between the insulation layer and the connection end portion of the wiring in a manner so as to be extended toward the inside of the contact hole from the connection end portion of the wiring. Therefore, in an etching process using the wiring as a mask, not only the insulation layer, but also the film is etched although the rate thereof is slow. For this reason, the above-mentioned insulation layer is not selectively etched rapidly. Therefore, it is possible to form the pattern end portion of the insulation layer into a forwardly-tapered shape.

With this arrangement, when the terminal section and the connection end portion of the wiring are connected by the connection conductive film through the contact hole, the connection conductive film is free from a step discontinuity at the pattern end of the insulation layer, thereby making it possible to improve the reliability of the connection.

Moreover, with respect to the above-mentioned liquid crystal display, the film is preferably formed by a material that has an etching rate that is faster than 1/20, and also slower than 1/2 of the etching rate of the insulation layer.

With the above-mentioned arrangement, since the film is formed by a material that has an etching rate that is faster than 1/20, and also slower than 1/2 of the etching rate of the insulation layer, it is possible to form the pattern end portion of the insulation layer into a forwardly-tapered shape ore positively.

With this arrangement, when the terminal section and the connection end portion of the wiring are connected by the connection conductive film through the contact hole, the connection conductive film is free from a step discontinuity at the pattern end of the insulation layer, thereby making it possible to improve the reliability of the connection.

Moreover, in the above-mentioned liquid crystal display, the connection end portion of the wiring is preferably extended toward the inside of the contact hole.

With this arrangement, when the terminal section and the connection end portion of the wiring are connected by the connection conductive film through the contact hole, since the connection end portion of the wiring is extended toward the inside of the contact hole, it is possible to ensure the connection between the connection end portion of the wiring and the connection conductive film.

Consequently, it becomes possible to positively provide superior conduction between the terminal section and the connection end portion of the wiring through the connection conductive film.

Moreover, in the above-mentioned liquid crystal display, the contact hole of the insulation layer is preferably formed after the formation of the wiring.

With the above-mentioned arrangement, when the contact hole of the insulation layer is patterned, for example, by etching, the wiring can be used as a mask; therefore, it is possible to eliminate the necessity of providing processes for forming photoresist and for separating and removing the photoresist separately.

This makes it possible to reduce the number of processes.

Moreover, in the above-mentioned liquid crystal display the terminal section and the wiring are preferably formed by a material having an etching rate slower than 1/5 of the etching rate of the insulation layer.

With the above-mentioned arrangement, upon etching and removing the insulation layer, since the terminal section and the wiring are hardly susceptible to etching, it is possible to form the contact hole in the insulation layer without giving adverse effects on the terminal section and the wiring.

Thus, it becomes possible to positively connect the terminal section and the wiring through the connection conductive film.

Moreover, in the liquid crystal display, the above-mentioned film is preferably allowed to cover the peripheral portion of the contact hole and to have a shape conforming to the peripheral shape of the contact hole.

In the above-mentioned arrangement, the film is formed so as to conform to the peripheral shape of the contact hole and also to cover the peripheral portion thereof. For example, in the case when the film has a doughnut-shape covering the peripheral portion of the contact hole, the connection width of an input signal at the time of being transmitted from the terminal section to the connection conductive film is represented by the length of the inner circumference of the doughnut-shape film. Since the film is formed into this shape, it becomes possible to widen the connection width through which the input signal is transmitted to the connection conductive film, and consequently to reduce the connection resistance. Thus, it becomes possible to provide superior conduction between the terminal section and the wiring.

Additionally, with respect to the shape of the film that conforms to the peripheral shape of the contact hole and also covers the peripheral portion thereof, for example, a U-letter shape film may be used in addition to the doughnut shape. This shape also provides the same functions and effects.

The manufacturing method of the liquid crystal display of the present invention is provided with: a first step for forming a terminal section and a gate electrode made of a metal film on an insulation substrate; a second step for forming an insulation layer that covers the terminal section and the gate electrode; a third step for forming a semiconductor film and an ohmic contact film on a connection end portion of the terminal section and the gate electrode so that a film is patterned and formed on the terminal section and a semiconductor operation layer of a thin-film transistor is patterned and formed on the gate electrode by the semiconductor film and the ohmic contact film; a fourth step for forming wiring so that the connection end portion of the wiring is placed on the film; a fifth step for forming a contact hole by etching and removing the insulation layer by using the wiring as a mask; and a sixth step for connecting the wiring and the terminal section by a connection conductive film through the contact hole.

In accordance with the above-mentioned method, during a process for forming a semiconductor operation layer of the thin-film transistor, the film is formed on the connection end portion of the terminal section through the gate insulation film. In other words, the film is formed in the same process that forms the semiconductor operation layer of the thin-film transistor; therefore, it is not necessary to increase the number of processes for forming films. Here, the resulting film has the same functions and effects as described above.

Therefore, it becomes possible to positively connect the terminal section and the connection end portion of the wiring by using the connection conductive film with ease, and consequently to ensure the reliability of the connection.

In the above-mentioned manufacturing method of the liquid crystal display, it is preferable to provide a process for forming a protective film for coating the insulation layer and the wiring between the fourth process and the fifth process, and also to form a contact hole in the protective film simultaneously with the formation of the contact hole in the insulation layer.

With the above-mentioned method, upon forming a contact hole for connecting the wiring and the terminal section in the protective film formed on the wiring, it is possible to form the contact hole simultaneously with the formation of the contact hole in the insulation layer. Therefore, it becomes possible to reduce the number of processes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manufacturing method of a liquid crystal display comprising:
   a first step for forming a terminal section and a gate electrode made of a metal film on an insulation substrate;

a second step for forming an insulation layer that covers the terminal section and the gate electrode;

a third step for forming a semiconductor film and an ohmic contact film on a connection end portion of the terminal section and the gate electrode so that a film is patterned and formed on the terminal section and a semiconductor operation layer of a thin-film transistor is patterned and formed on the gate electrode by the semiconductor film and the ohmic contact film;

a fourth step for forming wiring so that the connection end portion of the wiring is placed on the film;

a fifth step for forming a contact hole by etching and removing the insulation layer by using the wiring as a mask; and a sixth step for connecting the wiring and the terminal section by a connection conductive film through the contact hole.

2. A manufacturing method of a liquid crystal display as defined in claim 1, wherein a process for forming a protective film for coating the insulation layer and the wiring is prepared between the fourth process and the fifth process, and a process for forming a contact hole in the protective film simultaneously with the formation of the contact hole in the insulation layer is prepared in the fifth step.

3. A manufacturing method of a liquid crystal display comprising the steps of:

upon forming a first semiconductor layer for forming a thin-film transistor, forming a second semiconductor layer also in an area of a contact hole;

forming a thin-film transistor which includes the first semiconductor layer, a drain electrode having a through hole or a cut-out section which communicates with the lower layer in the areas of the source electrode and the contact hole so as to provide switching for a pixel;

on the thin-film transistor, stacking a protective film layer and a resin insulation film; and after forming a contact hole in the resin insulation film, etching and removing the protective film layer below the contact hole so that a pixel display electrode for applying a voltage to the liquid crystal is formed in the area of the contact hole in a manner so as to contact the drain electrode.

4. A manufacturing method of a liquid crystal display comprising the steps of:

forming a gate wire, a gate electrode connected to the gate wire a supplementary capacitance wire on an insulation substrate and a supplementary capacitance electrode connected to the supplementary capacitance wire;

forming a gate insulation film on the respective gate wire, the gate electrode, the supplementary capacitance wire and the supplementary capacitance electrode;

forming a first semiconductor layer made by stacking an a-Si film and an n+a-Si film, above the gate electrode through the gate insulation film, as well as simultaneously forming a second semiconductor layer made by stacking an a-Si film and an n+a-Si film, above the supplementary capacitance electrode through the gate insulation film;

forming a source electrode and a drain electrode, each having one end stacked on the second semiconductor layer above the gate electrode, and a source wire serving as a source line connected to the source electrode, the drain electrode having the other end also stacked on the first semiconductor layer above the supplementary capacitance electrode with the other end being provided with a cut-out section or a through hole;

etching and removing the n+a-Si film of the second semiconductor layer above the supplementary capacitance electrode while using the drain electrode having the cut-out section or the through hole as a mask;

simultaneously with the etching process of the n+a-Si film of the second semiconductor layer above the supplementary capacitance electrode, etching and separating the n+a-Si film of the first semiconductor layer while using as masks the source electrode and the drain electrode, each having one end stacked on the first semiconductor layer above the gate electrode;

forming a protective film layer over the entire surface of the substrate; forming a resin insulation film on the protective film layer; forming a contact hole in the resin insulation film with the pattern of the cut-out section or the through hole of the drain electrode above the supplementary capacitance electrode being allowed to traverse the contact hole as well as simultaneously removing the resin insulation film on the source signal input terminal, the gate signal input terminal and the supplementary capacitance signal input terminal;

simultaneously etching and removing the protective film layer on the source signal input terminal, the gate signal input terminal and the supplementary capacitance signal input terminal and the protective film layer on the bottom face section within the contact hole, while using as etching masks the patterned resin insulation film and the pattern of the cut-out section or the through hole of the drain electrode within the contact hole; and etching the gate insulation film on the gate signal input terminal and the supplementary capacitance signal input terminal so as to remove the gate insulation film on the gate signal input terminal, as well as simultaneously etching the a-Si film of the second semiconductor layer at a portion thereof exposed to an area surrounded by the cut-out section or the through hole of the drain electrode and the contact hole.

5. The manufacturing method of a liquid crystal display as defined in claim 4, wherein the cut-out section or the through hole, placed in the drain electrode inside the contact hole, is formed so as to have at least one portion thereof extended sideways from the area of the contact hole.

6. The manufacturing method of a liquid crystal display as defined in claim 4, wherein, with respect to the relationship between the a-Si film of the second semiconductor layer exposed to the area surrounded by the edge of the cut-out section or the through hole of the drain electrode as well as the edge of the contact hole and the gate insulation film within the area on the gate signal input terminal and the source signal input terminal side, the ratio of the respective etching rates is virtually the same as the ratio of the respective film thicknesses.

7. A manufacturing method of a liquid crystal display as defined in claim 3, wherein the contact hole is formed so that an area of the second semiconductor layer that is extended from a side face of the contact hole and the drain electrode accounts for 1/3 to 2/3 of the area of the contact hole.

* * * * *

UNITED STATES PATENT AND TRADEMARK OFFICE
CERTIFICATE OF CORRECTION

PATENT NO.    : 6,862,070 B1
DATED         : March 1, 2005
INVENTOR(S)   : Osamu Sugimoto and Hajime Imai Page 1 of 1

It is certified that error appears in the above-identified patent and that said Letters Patent is hereby corrected as shown below:

<u>Title page,</u>
Item [62], Related U.S Application Data, should read "DIV of application No. 09/737,541, filed 12/15/2000, now Pat. No. 6,771,346 --.

Signed and Sealed this

Second Day of May, 2006

JON W. DUDAS
*Director of the United States Patent and Trademark Office*